(12) United States Patent
Taya et al.

(10) Patent No.: US 8,096,693 B2
(45) Date of Patent: *Jan. 17, 2012

(54) LIGHT GUIDE PLATE AND BACKLIGHT UNIT

(75) Inventors: Masato Taya, Chikusei (JP); Tokutarou Komatsu, Abiko (JP); Yasushi Sugimoto, Tsukuba (JP); Tadashi Okuda, Chikusei (JP); Teruo Teshima, Nasu-machi (JP)

(73) Assignee: Hitachi Chemical Co., Ltd., Tokyo (JP)

( * ) Notice: Subject to any disclaimer, the term of this patent is extended or adjusted under 35 U.S.C. 154(b) by 86 days.

This patent is subject to a terminal disclaimer.

(21) Appl. No.: 12/289,656

(22) Filed: Oct. 31, 2008

(65) Prior Publication Data

US 2009/0129056 A1   May 21, 2009

(30) Foreign Application Priority Data

| Nov. 16, 2007 | (JP) | P2007-297909 |
| Dec. 3, 2007 | (JP) | P2007-312213 |
| Dec. 3, 2007 | (JP) | P2007-312214 |
| Dec. 4, 2007 | (JP) | P2007-313448 |
| Dec. 5, 2007 | (JP) | P2007-314581 |
| Dec. 5, 2007 | (JP) | P2007-314582 |

(51) Int. Cl.
*F21V 7/04* (2006.01)

(52) U.S. Cl. ........ 362/607; 362/330; 362/331; 362/339; 362/620

(58) Field of Classification Search .................... 362/19, 362/331, 335, 268, 328, 329, 330, 339, 606, 362/607, 615, 617–620, 603; 349/65; 359/640
See application file for complete search history.

(56) References Cited

U.S. PATENT DOCUMENTS 7,121,709 B2 * 10/2006 Shinohara et al. ............ 362/606
7,248,764 B2   7/2007 Park et al.

FOREIGN PATENT DOCUMENTS

| JP | 8-262441 | 10/1996 |
| JP | 2739730 | 1/1998 |
| JP | 2006-058844 | 3/2006 |
| JP | 2006-286489 | 10/2006 |
| JP | 2007-122958 | 5/2007 |
| KR | 10-2005-0079521 A | 8/2005 |
| KR | 10-2007-0100527 A | 10/2007 |

OTHER PUBLICATIONS

Notice of Submission of Arguments in Application No. 10-2008-0101882, issued Jul. 22, 2010, 3 Pages, Korean Intellectual Property Office, Republic of South Korea.

* cited by examiner

*Primary Examiner* — John A Ward
(74) *Attorney, Agent, or Firm* — Antonelli, Terry, Stout & Kraus, LLP.

(57) ABSTRACT

A light guide plate includes: a plate surrounded by two main surfaces and a plurality of end surfaces connecting the main surfaces, one of the end surfaces designated as an entrance surface, one of the main surfaces designated as a reflection surface; a first reflection element provided in a first region of the reflection surface separated from the entrance surface, and configured to reflect a light incident from the entrance surface in a first angle with respect to the reflection surface; and a second reflection element provided in a second region of the reflection surface between the entrance surface and the first region, and configured to reflect the light in a second angle different from the first angle with respect to the reflection surface.

17 Claims, 17 Drawing Sheets

Background

Background

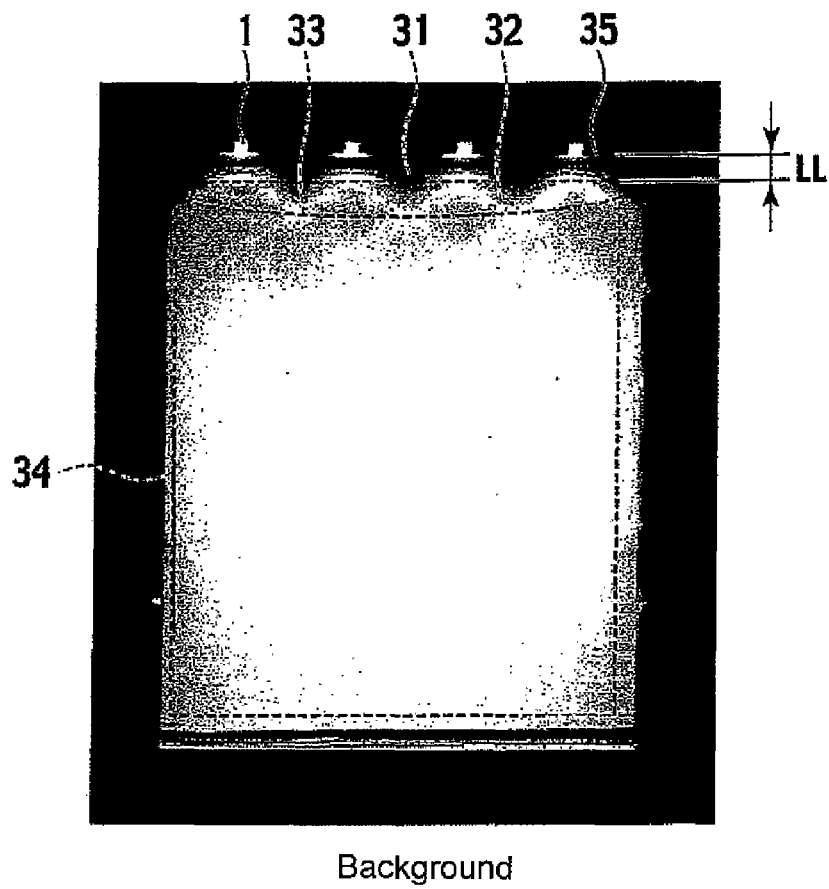
Background
FIG. 4
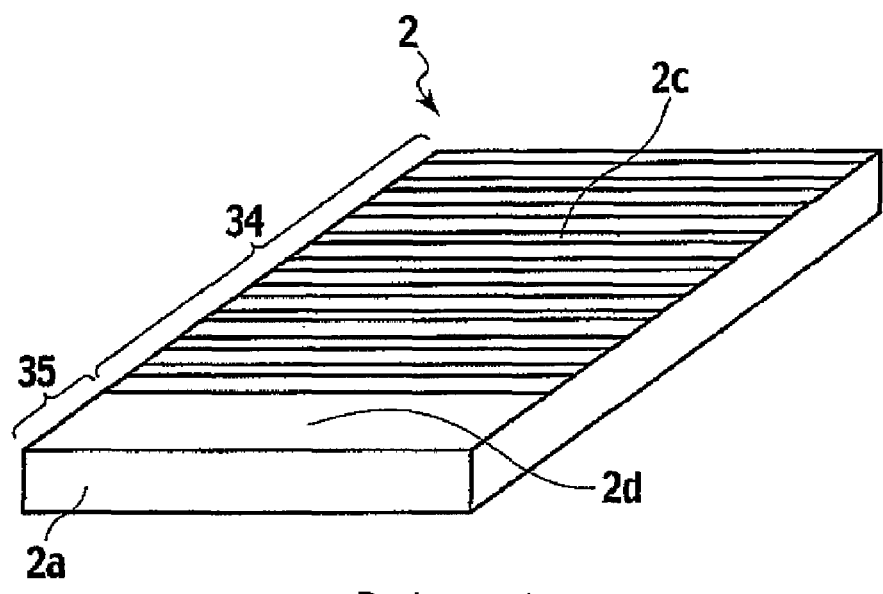
Background

|  | Diffusion Film | Haze (%) | Unevenness (mm) | Front Luminance (cd/m²) |
|---|---|---|---|---|
| Comp. Ex. 1 | - | - | 4.7 | 4120 |
| Ex. 1 | A | 54 | 4.9 | 2560 |
| Ex. 2 | B | 86 | 3.6 | 2610 |
| Ex. 3 | C | 91 | 3 | 2300 |

|  | Diffusion Film | Haze (%) | Unevenness (mm) | Front Luminance (cd/m$^2$) |
|---|---|---|---|---|
| Comp. Ex. 2 | - | - | 6.8 | 6060 |
| Ex. 4 | A | 54 | 4.8 | 4230 |
| Ex. 5 | B | 86 | 3.9 | 2821 |
| Ex. 6 | C | 91 | 3.3 | 2190 |

FIG. 17
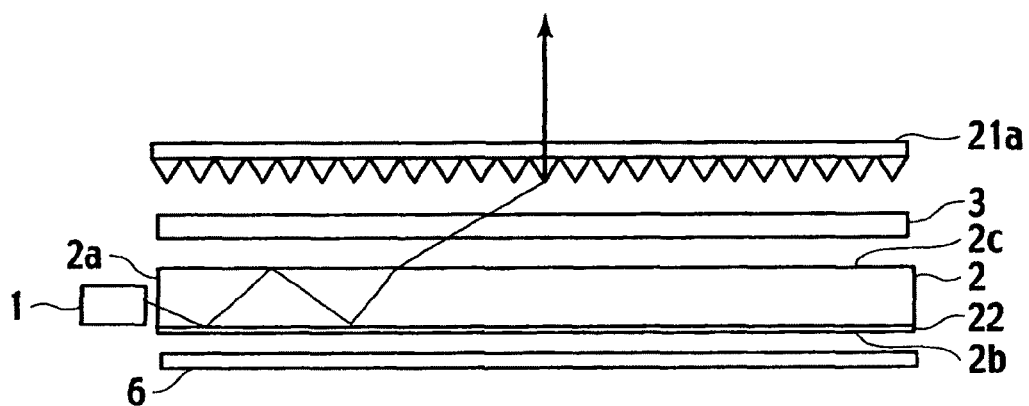
FIG. 18
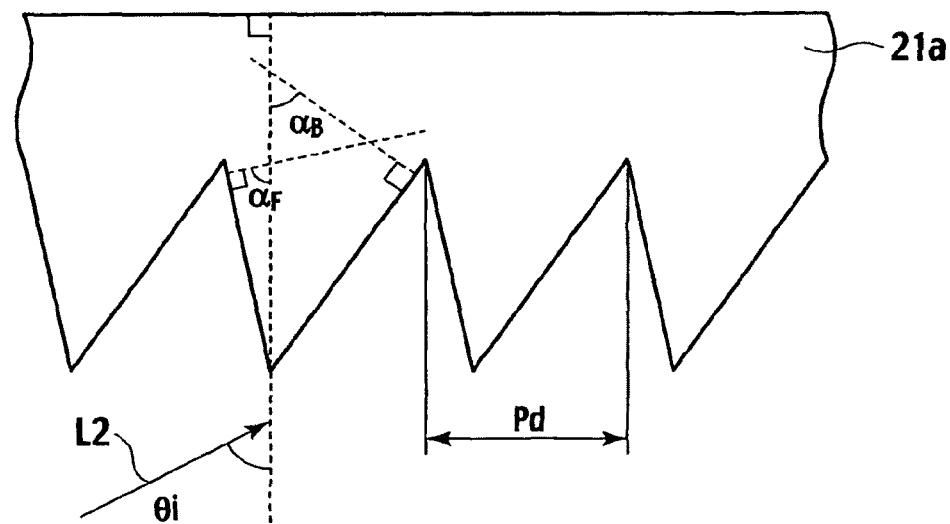
FIG. 19
| | Diffusion Film | Haze (%) | Unevenness (mm) | Front Luminance (cd/m$^2$) |
|---|---|---|---|---|
| Comp. Ex. 3 | – | – | 5.4 | 8910 |
| Ex. 7 | A | 54 | 4.5 | 6090 |
| Ex. 8 | B | 86 | 3.8 | 4010 |
| Ex. 9 | C | 91 | 3.4 | 2850 |

FIG. 31

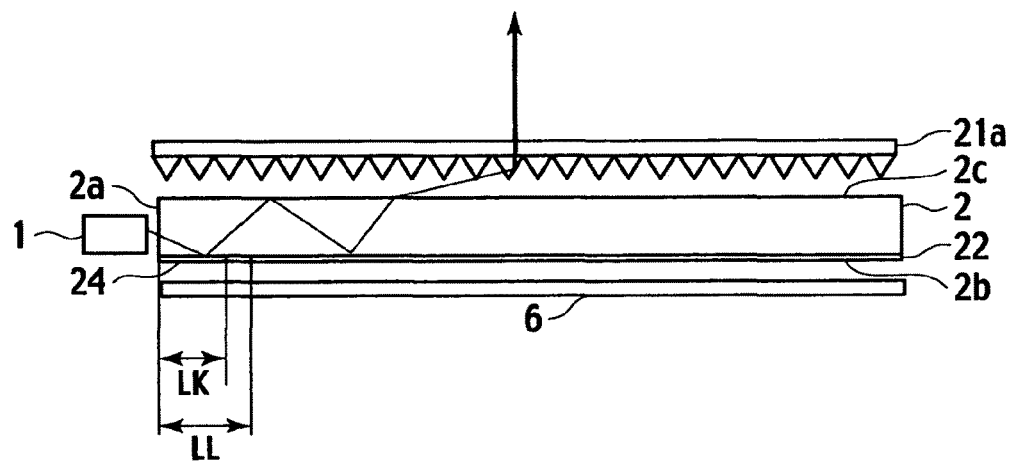

FIG. 32

|  | Light Guide Plate | | Lens Sheet | Unevenness (mm) |
|---|---|---|---|---|
|  | Second Groove | Reflection Surface | | |
| Ex. 10 | With | Bottom | Two Prism Sheets | 3.9 |
| Ex. 11 | With | Top | Two Prism Sheets | 3.3 |
| Ex. 12 | With | Bottom | Downward Prism Sheet | 4.5 |
| Ex. 13 | With | Top | Downward Prism Sheet | 3.6 |
| Ex. 14 | With | Bottom | Grating Sheet | 4.3 |
| Ex. 15 | With | Top | Grating Sheet | 3.5 |
| Comp. Ex. 1 | Without | Bottom | Two Prism Sheets | 4.7 |
| Comp. Ex. 2 | Without | Bottom | Downward Prism Sheet | 6.8 |
| Comp. Ex. 3 | Without | Bottom | Grating Sheet | 5.4 |

FIG. 35

|  | Lens Sheet | Distance LK (mm) | Unevenness (mm) | Appearance |
|---|---|---|---|---|
| Ex. 16 | Two Prism Sheets | 1.7 | 3.5 | G |
| Ex. 11 | Two Prism Sheets | 2 | 3.3 | G |
| Ex. 17 | Two Prism Sheets | 2.5 | 3.8 | NG |
| Ex. 18 | Two Prism Sheets | 3 | 3.7 | NG |
| Ex. 19 | Downward Prism Sheet | 1.7 | 3.7 | G |
| Ex. 13 | Downward Prism Sheet | 2 | 3.6 | G |
| Ex. 20 | Downward Prism Sheet | 2.5 | 3.9 | NG |
| Ex. 21 | Downward Prism Sheet | 3 | 4 | NG |
| Ex. 22 | Grating Sheet | 1.7 | 3.6 | G |
| Ex. 15 | Grating Sheet | 2 | 3.5 | G |
| Ex. 23 | Grating Sheet | 2.5 | 3.8 | NG |
| Ex. 24 | Grating Sheet | 3 | 3.9 | NG |

LIGHT GUIDE PLATE AND BACKLIGHT UNIT

CROSS REFERENCE TO RELATED APPLICATIONS AND INCORPORATION BY REFERENCE

This application is based upon and claims the benefit of priority from prior Japanese Patent Applications P2007-297909 filed on Nov. 16, 2007, P2007-312213 filed on Dec. 3, 2007, P2007-312214 filed on Dec. 3, 2007, P2007-313448 filed on Dec. 4, 2007, P2007-314581 filed on Dec. 5, 2007, and P2007-314582 filed on Dec. 5, 2007; the entire contents of which are incorporated by reference herein.

BACKGROUND OF THE INVENTION

1. Field of the Invention

The present invention relates to a light guide plate and a backlight unit, which are used in a transmissive or semi-transmissive liquid crystal display apparatus, an advertisement plate, an emergency guide light and the like.

2. Description of the Related Art

In recent years, color liquid crystal display (LCD) apparatuses are widely used in various devices such as a portable telephone, a portable personal computer, a portable liquid crystal television or a video integrated liquid crystal television and the like. The LCD apparatus is basically provided with a backlight unit and a liquid crystal element. Configuration of the backlight unit can be roughly classified into a direct type and an edge light type. For the direct type backlight unit, a light source is placed just beneath a liquid crystal element. For the edge light type backlight unit, a light source is placed on a side of a translucent light guide plate so that a light is emitted from the entire surface of the light guide plate. From the viewpoint of downsizing the LCD apparatus, the edge light type backlight unit is commonly used.

In such LCD apparatus, it is required to extend the operating time of the battery. However, the backlight unit used in the LCD apparatus consumes a high proportion of the electric power, which is an obstacle for extending the operating life of the battery. In order to extend the operating life of the battery and to improve the practical value of the LCD apparatus, it is very important to reduce the electric power consumption of the backlight unit as much as possible. However, if luminance of the backlight unit is decreased by reducing the electric power consumption of the backlight unit, display quality of the LCD apparatus may undesirably deteriorate. Therefore, in order to reduce the electric power consumption without decreasing the luminance of the backlight unit, development of a backlight unit having high luminance efficiency and evenness is advancing.

Currently, the most popular backlight unit includes a light source 1, a light guide plate 2, a diffusion film 3, upward prism sheets 4, 5 and a reflection sheet 6, as shown in FIG. 1. The light emitted from the light source 1, such as a light emitting diode (LED) and the like, enters in the light guide plate 2 from an entrance surface of the light, which is an end surface 2a of the light guide plate 2, and is guided inside the light guide plate 2. The light is reflected by a reflection element 122 having a plurality of grooves, a plurality of dots and the like. The reflection element 122 is formed on a reflection surface. The reflection surface is a bottom surface 2b of the light guide plate 2. The light is emitted in an oblique direction from an emitting surface defined by a top surface 2c of the light guide plate 2. The arrangement of the reflection element is designed such that the in-plane distribution of the luminance is even. For example, a surface density of the reflection element is low in the vicinity of the light source 1, and the surface density becomes higher as the distance from the light source 1 becomes longer. Consequently, the LCD apparatus has an even luminance.

However, the light is emitted in the oblique direction from the light guide plate 2. Thus, in order to effectively use the light, it is necessary to deflect and collect the light in a normal direction of the backlight unit. Therefore, the diffusion sheet 3 is placed on the light guide plate 2 so as to improve the evenness and to deflect the output light from the light guide plate 2 in the normal direction of the backlight unit. Moreover, as the lens sheet for controlling the direction of the lights and collecting the lights, two laminated upward prism sheets 4, 5 are provided. The prism sheets have a plurality of prism columns, each of which has a triangular cross section with an apex angle of about 90°, and are disposed on the diffusion sheet 3. The upward prism sheets 4, 5 are laminated such that each array direction of the prism columns is orthogonal to each other, so as to improve luminance efficiency of the backlight unit.

In the orthogonal configuration in which each array direction of the prism columns of the upward prism sheets 4, 5 is orthogonal to each other, directional control is performed for deflecting the emitted light from the light guide plate 2 to the normal direction of the backlight unit mainly by refraction on slant surfaces of the prism columns. Therefore, since apart of the light is laterally reflected and refracted, it is difficult to improve luminance efficiency. On the other hand, another part of the light is totally reflected in a downward direction out of the light guide plate 2. This light may be reflected by the reflection sheet 6 placed on a backside of the backlight unit and can be reused. The reused light may be emitted from a different position from the reflected position of the light guide plate 2. Thus, it is effective for resolving in-plane uneven luminance and increasing uniformity of the luminance. Since the arrangement shown in FIG. 1 provides a good balance between the efficiency and evenness of the luminance, this arrangement is widely used.

However, the orthogonal configuration of the upward prism sheet 4, 5 has limitations for improving the luminance efficiency, as discussed above. Thus, a light guide plate and a backlight unit, which are intended to provide high luminous intensity, have been developed.

A backlight unit having a downward prism sheet used as a lens sheet has been proposed (refer to JP No. 2739730). The proposed backlight unit is designed such that the diffusion film 3 and two upward prisms 4, 5 shown in FIG. 1 are replaced with a downward prism sheet 21, as shown in FIG. 2. The downward prism sheet 21 has a plurality of prism columns, each of which has a triangular cross section. The prism sheet 21 is downwardly disposed so that the prism columns face the top surface 2c of the light guide plate 2. The array direction of the prism columns is parallel to the end surface 2a of the light guide plate 2. The obliquely directed light emitted from the light guide plate 2 is refracted on a slant surface of each prism columns and totally reflected at another slant surface in the normal direction of the backlight unit. Thus, the emitted light from the light guide plate 2 is deflected in the normal direction of the backlight unit. In the configuration using the downward prism sheet 21, the directional light emitted from the light guide plate 2 is directly and totally deflected in the normal direction of the backlight unit. Thus, the front luminance efficiency may be increased in principle.

Furthermore, the number of parts in the lens sheet can be reduced to only one downward prism sheet 21. However, since the emitted light has a high directivity, it is difficult to reduce unevenness of the entering light and to assure even luminance. In practice, the diffusion film is stacked on the downward prism sheet 21 in many cases.

Recently, in the display of portable devices, LEDs are usually used as the light source. As shown in FIG. 3, in case of using LEDs as the light source 1, when the backlight is turned on and viewed from the front, an uneven light entrance region 33, in which a dark portion 31 and a bright portion 32 are clearly split due to the directional characteristics of the light emitted from the LEDs, occurs in the vicinity of the light entrance portion of the backlight. When reducing thickness and downsizing of the devices, the area ratio of a display area 34 in the backlight unit tends to be increased, and a distance LL of a light entrance area 35 between the entrance surface 2a and the end of the display area 34 is decreased. For this reason, minimization of the unevenness of the entering light is also an important subject.

The backlight unit of the downward prism sheet configuration disclosed in JP No. 2739730 has a disadvantage in that, since the output light from the light guide plate is emitted in the normal direction directly with one deflection without any redirect by reflection, a region where the uneven light is visible in the vicinity of the light entrance portion may increase. Also, even if the diffusion sheet is stacked on the downward prism sheet to improve the light unevenness, the light unevenness cannot be effectively reduced. Thus, in the actual situation, the configuration using a downward prism sheet is limited to the backlight unit in which the non-display area is large.

A backlight unit having higher luminance than the backlight unit of the downward prism sheet configuration has been proposed (refer to JP-A 2006-58844 (KOKAI)). The proposed backlight unit has a similar configuration shown in FIG. 2 and differs from the configuration shown in FIG. 2 in that a lens sheet having a saw-tooth shaped diffraction grating with a pitch of about 10 μm or less is used instead of the downward prism sheet. By designing the shape of the diffraction grating in detail, variation of the output angle of the light can be decreased with respect to variation of the incident angle of the light, and a high light collection efficiency is achieved. Also, by designing a shape of a diffraction grating so that an angle at which the diffraction efficiency of each wavelength of the three primary colors of blue, green and red is maximal corresponds to the normal direction of the emitting surface of the diffraction grating, the dispersion characteristic of the diffraction grating, may be suppressed. Moreover, the output light of the lens sheet is controlled by multiple interference of the diffraction lights transmitted through the plurality of concave and convex regions in the sawtooth shaped diffraction grating. Thus, the diffraction grating method has merit, even if one of the concave and convex regions is chipped, or if a foreign particle is on the diffraction grating, influence on the output light is small.

However, the region of uneven visible light may also increase in the diffraction grating method, because the output light from the light guide plate is directly emitted in the normal direction, although there is a difference between the diffraction and the total reflection, as compared with the downward prism method.

As a method of improving the problem of uneven light, as shown in FIG. 4, a technique to form a reflection element on the top surface 2c corresponding to the display area 34, and to form a dot pattern or a rough surface by sandblasting a surface 2d corresponding to the light entrance area 35 near the light entrance portion of the light guide plate 2 has been proposed (refer to JP-A 2006-286489 (KOKAI), and JP-A 2007-122958 (KOKAI)). In the proposed methods, the degree of uneven light is reduced by spreading the guided light inside the light guide plate 2 under the surface 2d near the light entrance portion by dispersion and dispersing the light emitted from the surface 2d near the light entrance portion.

However, since the above-discussed methods disperse the light, it is difficult to control the emitting direction of the light, and there is a disadvantage in that the light is dispersed in a direction that does not contribute to improve the problem of uneven light. That is, although the uneven light viewed from the front of the backlight unit is improved, the uneven light viewing from a specific direction other than the front direction is larger. Also, since the light is not efficiently used in the vicinity of the light entrance portion, luminance in the display area is decreased as a result. Thus, it is difficult to design a dot shape to achieve a balance between the light unevenness and luminance of the backlight unit, and to determine an appropriate sandblast condition.

SUMMARY OF THE INVENTION

An object of the present invention is to provide a light guide plate and a backlight unit capable of decreasing uneven light characteristics in the vicinity of a light source.

A first aspect of the present invention inheres in a light guide plate including a plate surrounded by two main surfaces and a plurality of end surfaces connecting the main surfaces, one of the end surfaces designated as an entrance surface, one of the main surfaces designated as a reflection surface; a first reflection element provided in a first region of the reflection surface separated from the entrance surface, and configured to reflect a light incident from the entrance surface in a first angle with respect to the reflection surface; and a second reflection element provided in a second region of the reflection surface between the entrance surface and the first region, and configured to reflect the light in a second angle different from the first angle with respect to the reflection surface.

A second aspect of the present invention inheres in a backlight unit including a light source; a light guide plate surrounded by two main surfaces and a plurality of end surfaces connecting the main surfaces, one of the end surfaces designated as an entrance surface, one of the main surfaces designated as a reflection surface; a first reflection element provided in a first region of the reflection surface separated from the entrance surface, and configured to reflect a light incident from the entrance surface in a first angle with respect to the reflection surface; a second reflection element provided in a second region of the reflection surface between the entrance surface and the first region, and configured to reflect the light in a second angle different from the first angle with respect to the reflection surface a lens sheet facing the light guide plate, and configured to control a direction of the light and to collect the light; and a reflection sheet facing the light guide plate on an opposite side of the lens sheet.

BRIEF DESCRIPTION OF DRAWINGS

FIG. 3 is a view showing an example of light unevenness in an entrance portion when the backlight unit is turned on.

FIG. 4 is a schematic view showing an example of a conventional light guide plate.

FIG. 17 is a cross sectional view showing still another example of the backlight unit used in the description of the embodiment of the present invention.

FIG. 18 is a cross sectional view showing an example of a diffraction grating sheet used in the description of the embodiment of the present invention.

FIG. 19 is a table showing still another example of measurement results of the light unevenness of the backlight unit using the diffusion sheet.

FIG. 31 is a sectional view showing still another example of the backlight unit according to the embodiment of the present invention.

FIG. 32 is a table showing an example of measurement results of the light unevenness of the backlight unit according to the embodiment of the present invention.

FIG. 35 is a table showing an example of results of light unevenness measurement and appearance evaluation of the backlight unit according to the embodiment of the present invention.

DETAILED DESCRIPTION OF THE INVENTION

Figure 1:
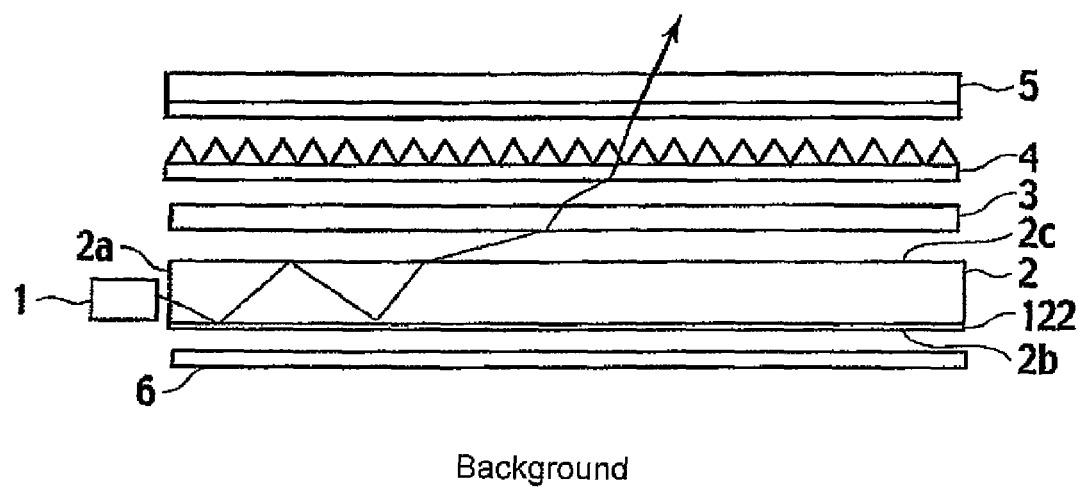
FIG. 1 is a schematic view showing an example of a configuration of a conventional backlight unit.
Figure 2:
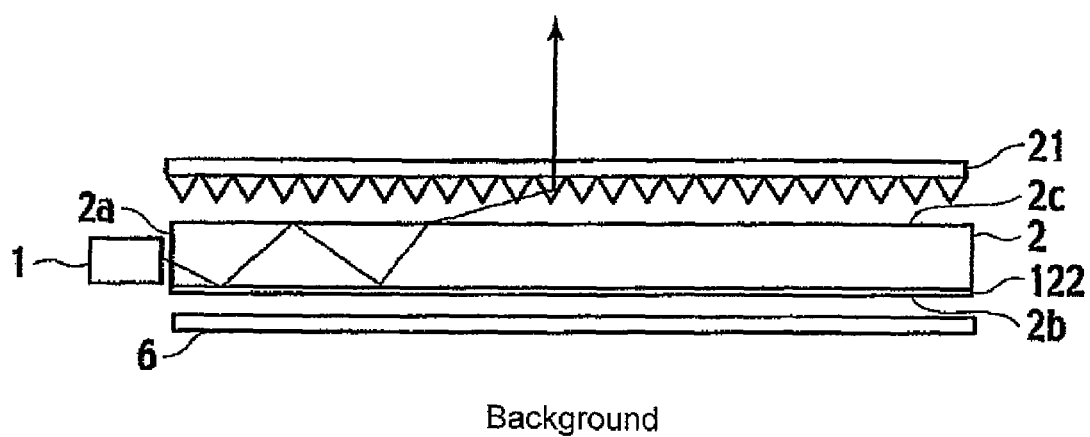
FIG. 2 is a schematic view showing another example of a configuration of a conventional backlight unit.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

(Light Guide Plate)

The inventors have achieved a light guide plate and a backlight unit, which are capable of reducing uneven light, by angle distribution measurement of the output light from the light guide plate, light unevenness measurement of an entrance portion, visual observation in the vicinity of a light entrance area, shape design of a reflection element in the vicinity of the light entrance area of the light guide plate, and angle distribution simulation of the output light. The procedure for achieving the light guide plate according to the embodiment of the present invention is preferably as described below.

Step 1: Light unevenness of the light entrance area is measured using diffusion films having different hazes inserted between the light guide plate and a lens sheet (light collection sheet) of the backlight unit. Here, the term "haze" is referred to a diffusion ratio of light.

Step 2: The diffusion film having a haze that improves the light unevenness (uneven light) is selected, and luminance angle distribution of the lights passing through the selected diffusion film is measured.

Step 3: The measured luminance angle distributions are converted to luminous intensity angle distributions, respectively.

Step 4: The rest of the angle distribution eliminating the angle components of the lights, which clearly does not have an improvement effect for the light unevenness, or emitted in unnecessary directions, from the converted luminous intensity angle distributions is determined as a target angle distribution for improving the light unevenness in the vicinity of the light entrance portion.

In the foregoing steps, the position of the angle distribution measurement in Step 2 is preferably the center of the light guide plate. Because, in the angle distribution in the vicinity of the light entrance portion, the actual area for the luminance measurement in the high angle side becomes large, and an accurate measurement may be difficult. The reason why the luminance is converted into the luminous intensity in Step 3 is that, since the luminance angle distribution becomes large in the high angle side in accordance with the definition of the luminance, the luminance distribution is biased to the high angle side, and it is difficult to accurately determine the proper range of the angle distribution to improve the light unevenness.

Figure 5:
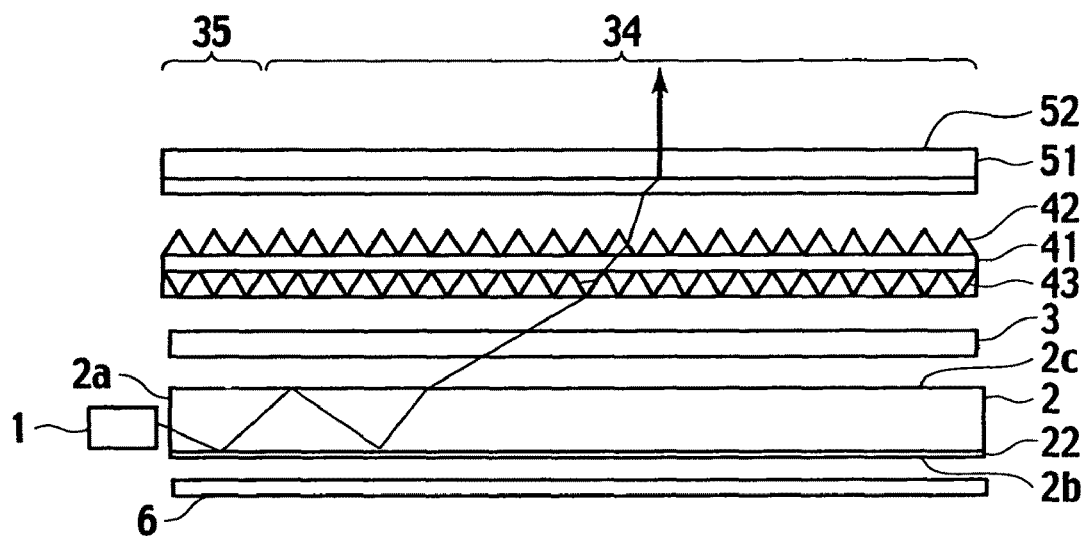
FIG. 5 is a cross sectional view showing an example of a backlight unit used in a description of an embodiment of the present invention.

At first, the embodiment is described by using a backlight unit shown in FIG. 5. As shown in FIG. 5, the backlight unit includes a light source 1, a light guide plate 2, a diffusion sheet 3, lens sheets (41, 51) and a reflection sheet 6. The lens sheets (41, 51) include a prism sheet 41 and a prism sheet 51. The light guide plate 2 is surrounded by a top surface (first main surface) 2c, a bottom surface (second main surface) 2b, and a plurality of end surfaces connecting the top and bottom surfaces. The light source 1 is positioned so as to face at least one of end surfaces, for example, an end surface 2a of the light guide plate 2. The diffusion sheet 3 is positioned so as to face the top surface 2c of the light guide plate 2. The reflection sheet 6 is positioned so as to face the bottom surface 2b of the light guide plate 2. The prism sheet 41 is positioned so as to face the diffusion sheet 3. The prism sheet 51 is positioned in an opposite side of the diffusion sheet 3 with regard to the prism sheet 41.

In the light guide plate 2, the end surface 2a is designated as an entrance surface of the light. The top surface 2c substantially orthogonal to the end surface 2a is designated as an emitting surface of the light. The bottom surface 2b is designated as a reflection surface. The light of the light source 1 enters from the end surface 2a of the light guide plate 2 and is obliquely emitted from the top surface 2c of the light guide plate 2. The light incident to the lens sheets (41, 51) from the light guide plate 2 is collected by the prism sheets 41, 51, respectively, and deflected vertically to the lens sheet (41, 51). The light emitted from the bottom surface 2b of the light guide plate 2 is reflected by the reflection sheet 6 and redirected to the light guide plate 2.

Figure 6:
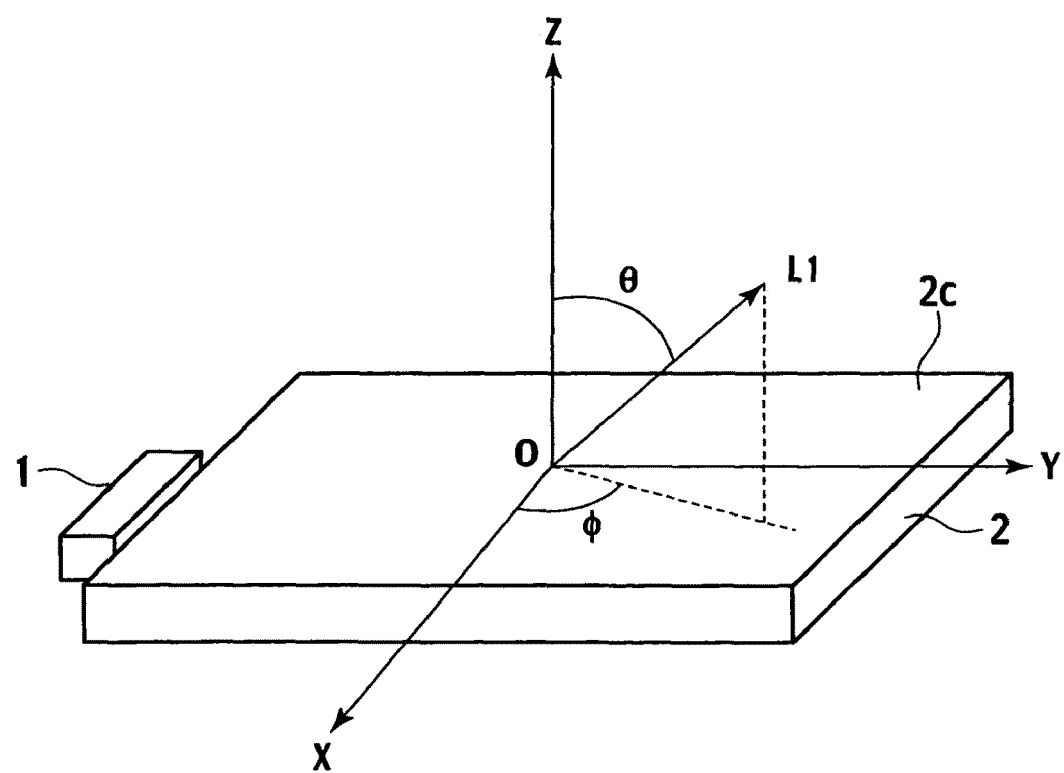
FIG. 6 is a schematic view describing the definition of angles of an output light from the light guide plate.
Figure 7:
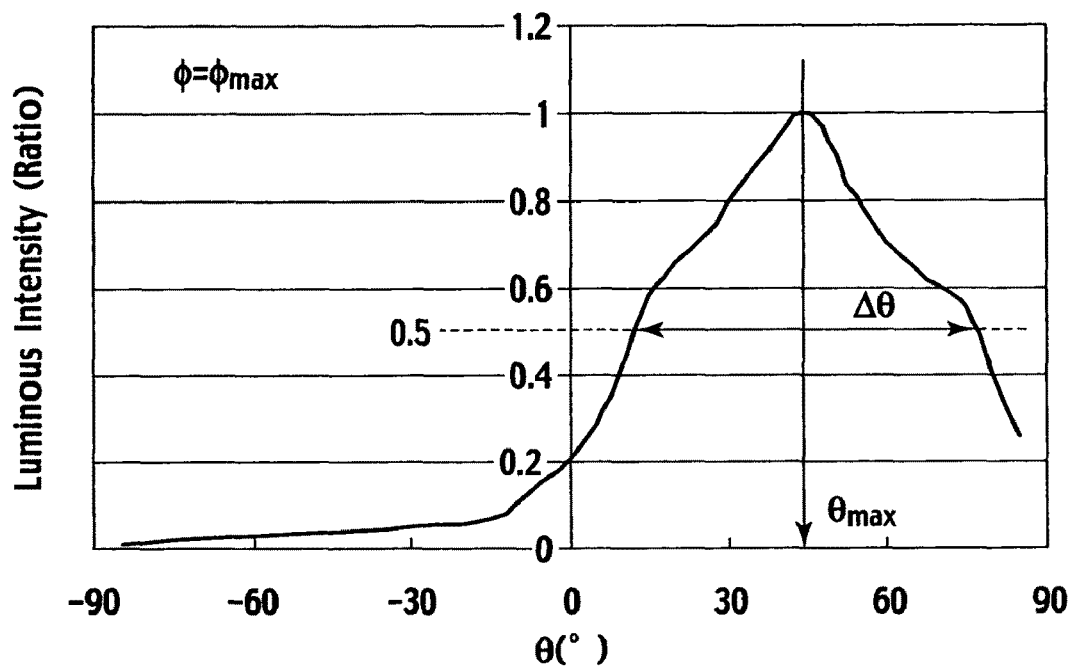
FIGS. 7 and 8 are views describing angle distributions of luminous intensities of the output lights from the light guide plate.
Figure 8:
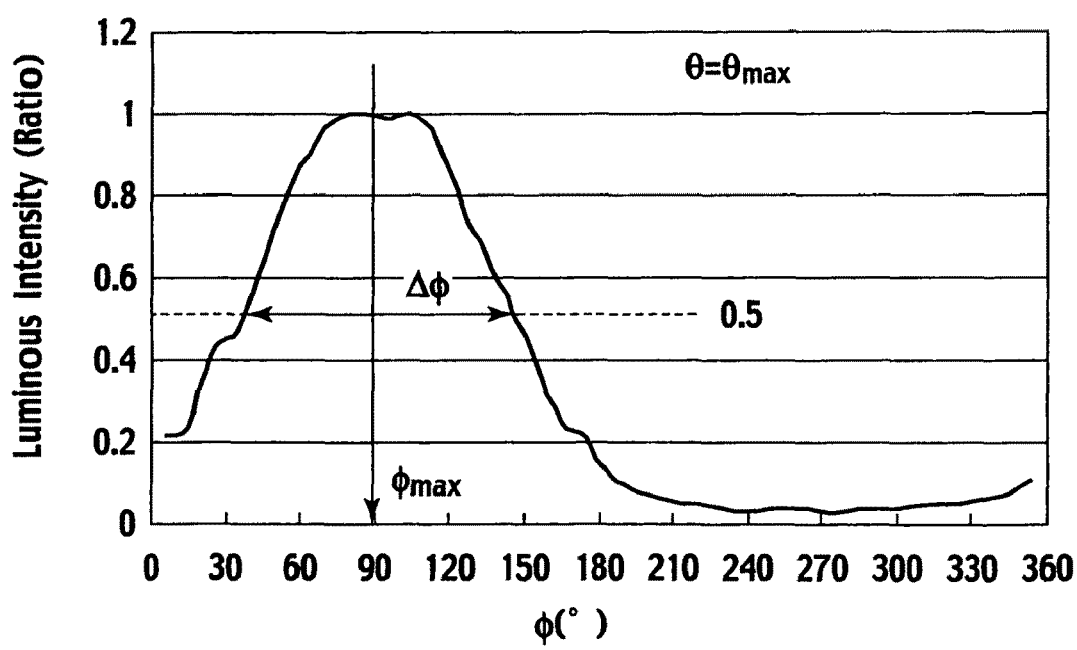

As shown in FIG. 6, on the top surface 2c of the light guide plate 2, the direction parallel to the end surface 2a is defined as an X-axis. The direction orthogonal to the X-axis and away from the light source 1 is defined as a Y-axis. The direction orthogonal to the X-axis and the Y-axis and oriented upwardly from the top surface 2c is defined as the Z-axis. Additionally, a zenith angle between an output light L1 from the top surface 2c and the Z-axis is denoted by $\theta$, and an azimuth angle between a projection line to the top surface 2c of the output light L1 and the X-axis is denoted by $\phi$. Also, in the luminous intensity distribution with regard to the zenith angle $\theta$ and the azimuth angle $\phi$ of the output light from the emitting surface, as shown in FIGS. 7 and 8, the zenith angle $\theta$ and the azimuth angle $\phi$ at which the luminous intensity is the highest are denoted by $\theta$max and $\phi$max, respectively, and the full width at half maximum (FWHM) angles of the zenith angle $\theta$ and the azimuth angle $\phi$ are denoted by $\Delta\theta$ and $\Delta\phi$, respectively.

Three LEDs (for example, NSCW215 made by Nichia Corporation) are used for the light source 1. The light source 1 is not limited to the LED. For example, the light source, such as a cold cathode fluorescent lamp (CCFL) and the like, may be used.

A commercially available silver sheet (for example, LUIRE MIRROR 60W10 made by REIKO Co., Ltd.) is used for the reflection sheet 6. There are no special limitations for the reflection sheet 6. However, the use of a reflection sheet, such as the silver sheet and the like, having a mirror reflection function is advantageous from the viewpoint of the luminance.

The light guide plate 2 has, for example, a width of about 30.8 mm, a length of about 39.2 mm and a thickness of about 0.6 mm. For the light guide plate 2, a transparent resin, such as polycarbonate, acryl and the like, may be used. For example, the light guide plate 2 can be fabricated by injection molding and the like using a polycarbonate molding material, such as LC1500 made by Idemitsu Kosan Co., Ltd. A reflection element 22 is provided on the bottom surface 2b of the light guide plate 2.

For the reflection element 22, a plurality of grooves may be used. The shape and arrangement of the grooves are designed by ray tracing simulation so that in-plane luminance distribution of the output lights from the light guide plate 2 is even. As a result of the simulation, the grooves having bottom angles between about 1.7° and about 2°, which are continuously formed in abutting relationship with each other on the bottom surface 2b, are used for the reflection element 22. In the display area 34 provided in the center of the light guide plate 2, the zenith angle $\theta$max at which the luminous intensity of the output light is maximal is about 68°. Note that a plurality of dots may be used for the reflection element 22.

For example, a hologram diffuser is provided on the top surface 2c of the light guide plate 2. A prism pattern which includes two kinds of prism columns having ridge lines in the thickness direction of the light guide plate 2 is provided on the end surface 2a. The apex angles of the prism columns are about 100° and about 140°, respectively. The prism pattern of the end surface 2a is formed such that an area ratio of portions where the prism columns having the apex angles of about 100° and about 140° are formed in the end surface 2a, and a flat portion where the prism columns are not formed in the end surface 2a, is about 9:8:7.

For the diffusion sheet 3, a commercially available diffusion film (for example, LIGHTUP made by Kimoto Co., Ltd.) is used. For the diffusion sheet 3, three kinds of diffusion films having different hazes of about 54%, about 86% and about 91% are used.

A plurality of prism columns 42 is provided on the top surface of the prism sheet 41 so as to face the prism sheet 51. A plurality of prism columns 43 is provided on the bottom surface of the prism sheet 41 so as to face the diffusion sheet 3. A plurality of prism columns 52 is provided on the top surface of the prism sheet 51 in the opposite side with regard to the prism sheet 41.

Figure 9:
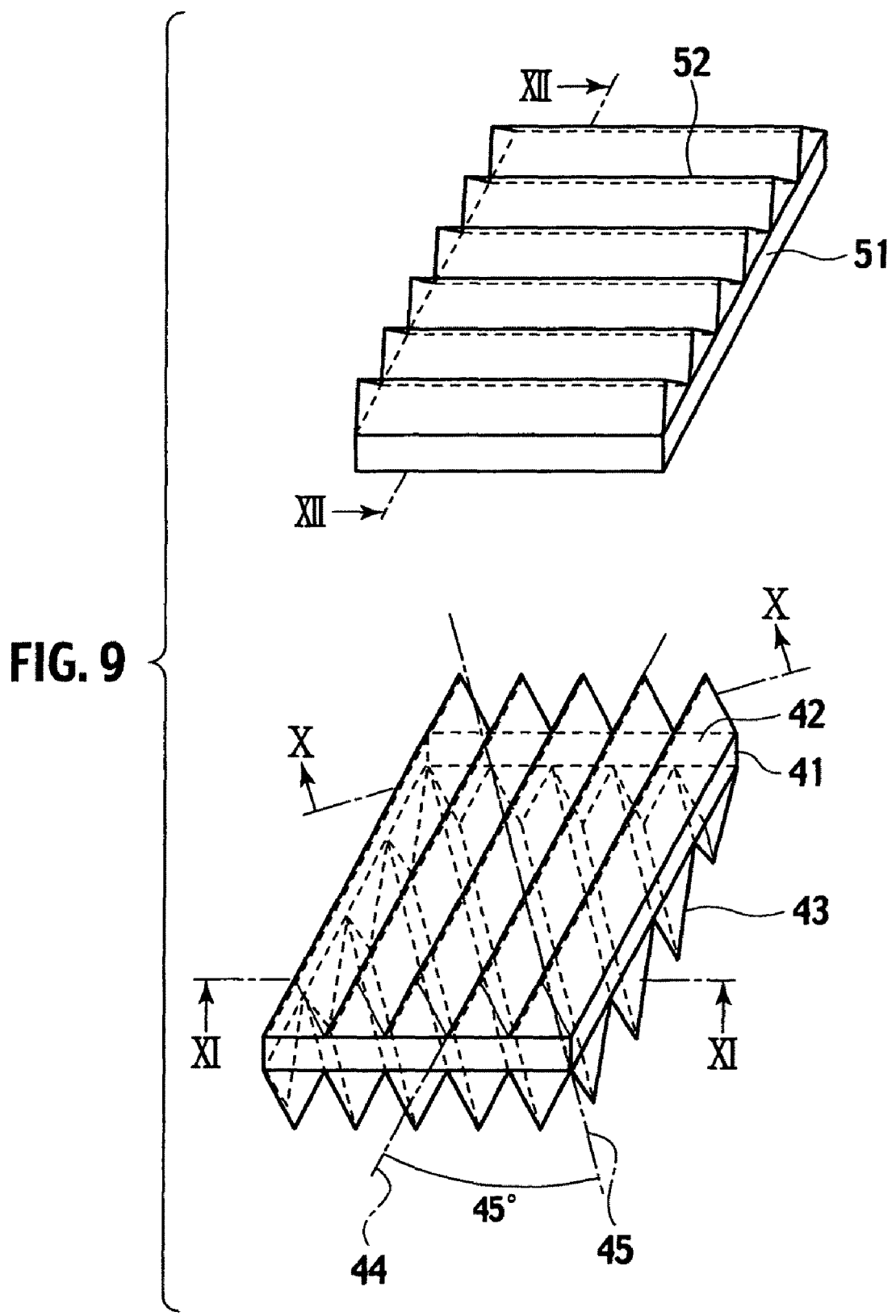
FIGS. 9 to 12 are schematic views showing an example of the prism sheet used in the description of the embodiment of the present invention.

As shown in FIG. 9, on the top surface of the prism sheet 41, the plurality of prism columns 42 is arranged adjacent to each other so that the ridge line direction 44 is parallel to the end surface 2a of the light guide plate 2. On the bottom surface of the prism sheet 41, the plurality of prism columns 43 is arranged adjacent to each other so that the angle between the ridge line direction 45 and the ridge line direction 44 of the prism columns 42 is about 45°. On the top surface of the prism sheet 51, the plurality of prism columns 52 is arranged adjacent to each other so that the ridge line direction is perpendicular to a plane parallel to the end surface 2a.

Figure 10:
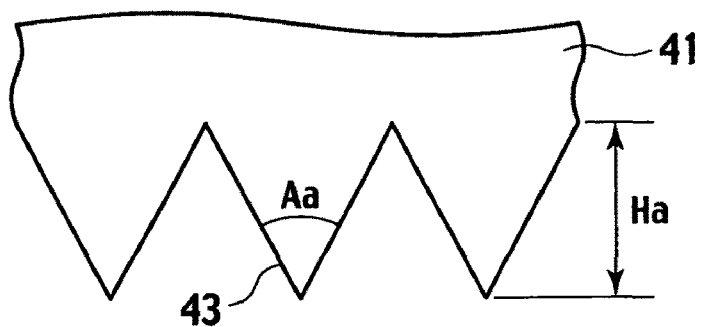
Figure 11:
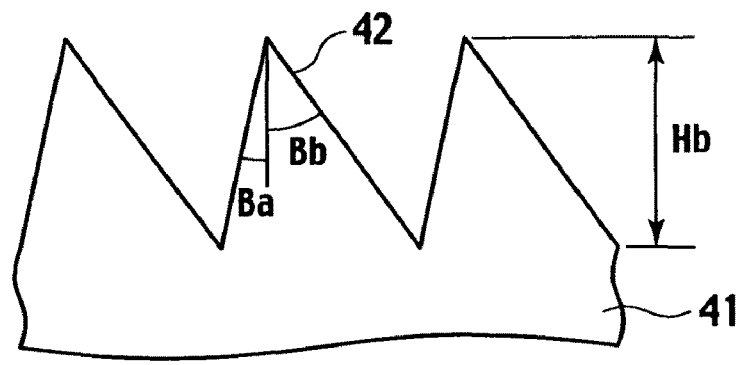
Figure 12:
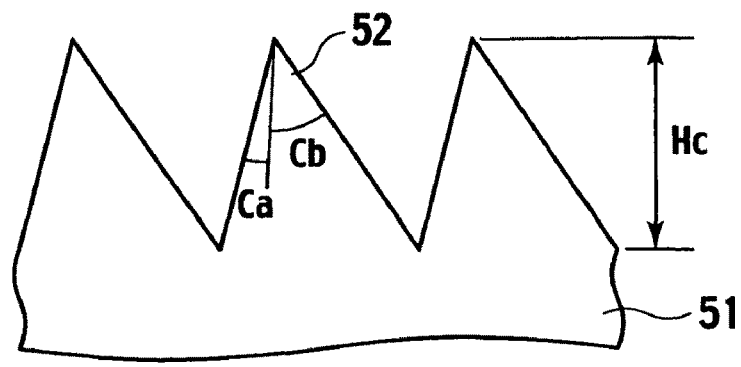

As shown in FIG. 10, each apex angle Aa of the prism columns 43 in the prism sheet 41 is about 58.5°. As shown in FIG. 11, angles Ba and Bb between the normal line of the prism sheet 41 and each of two prism surfaces of the prism columns 42 in the prism sheet 41 are about 10° and about 48.5°, respectively. As shown in FIG. 12, angles Ca and Cb between the normal line of the prism sheet 51 and each of two prism surfaces of the prism columns 52 in the prism sheet 51 are about 10° and about 48.5°, respectively. Each height Ha of the prism columns 43, 42 and 52 is about 23 μm.

In evaluating light for the backlight unit having the foregoing structure, a current of about 15 mA is applied to each of the three LEDs used in the light source 1. A luminance measuring apparatus (for example, RISA made by HI-LAND Co., Ltd.) is used to measure front luminance of the center portion of the backlight unit (the display area 34 shown in FIG. 5). Also, luminance angle distribution of the center portion of the backlight unit is measured by using a liquid crystal panel viewing angle measuring apparatus (for example, EZ Contrast made by ELDIM). Relative luminous intensity in each direction is calculated in accordance with the measured luminance angle distribution.

Figures 13, 14:
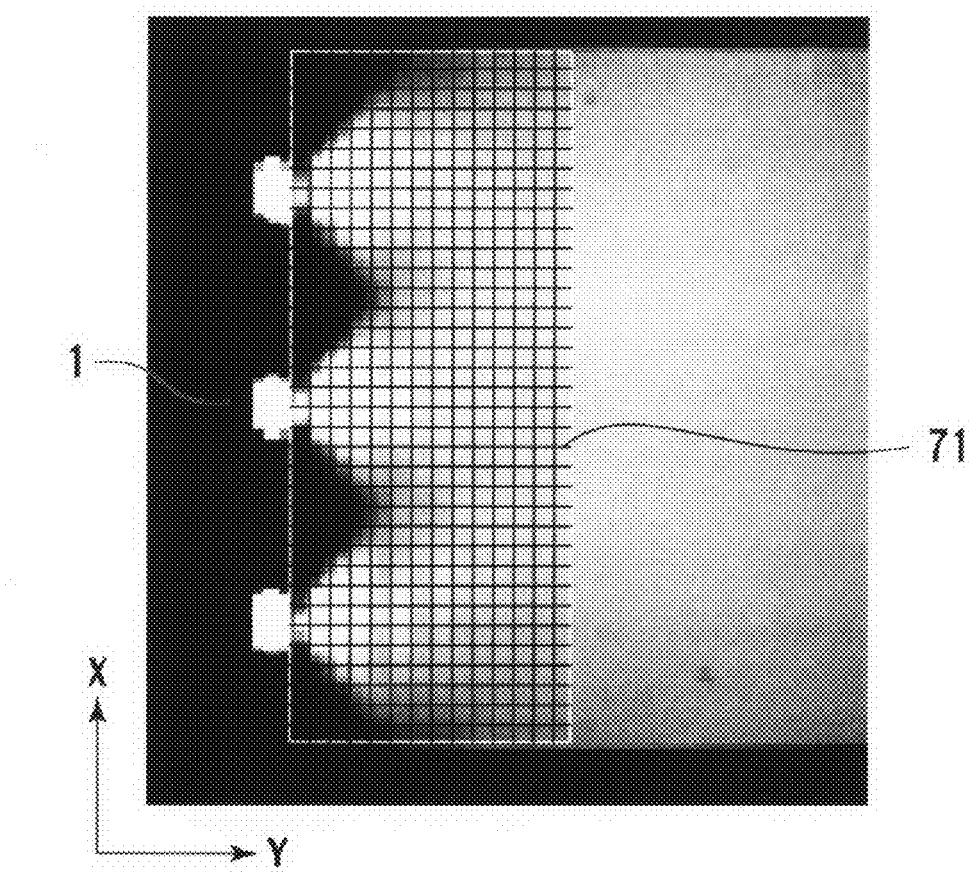
FIG. 13 is a view for describing the definition and measuring method of the light unevenness in the entrance portion of the light guide plate.
FIG. 14 is a table showing an example of measurement results of the light unevenness of a backlight unit using the diffusion sheet.

A measuring method of the light unevenness of the entrance portion of the backlight unit will be described below. FIG. 13 is a front view showing the vicinity of the entrance portion of the backlight unit when the backlight unit is turned on. As shown in FIG. 13, three LEDs of the light source 1 are arrayed along the end surface 2a of the light guide plate 2 shown in FIG. 5. In the vicinity of the light entrance area 35, a width of about 30.8 mm in a direction (X-direction) parallel to the array direction of the light source 1 is divided into 100 sections, and a length of about 9 mm in a direction (Y-direction) orthogonal to the array direction of the light source 1 is divided into 30 sections, so as to form a mesh 71. Front luminance has been measured using the luminance measuring apparatus with positional resolution of a diameter of about 0.1 mm in each section of the mesh 71. A ratio between the minimal and maximal luminance data, that is, (the minimum value)/(the maximum value) among the 100 sections in the X-direction at a certain distance Y away from the light source 1 is defined as a uniformity ratio at the distance Y. The minimum distance Y in which the uniformity ratio is 0.6 or more is defined as "entrance unevenness", or simply "unevenness".

FIG. 14 is a table showing the measurement result of the entrance unevenness and front luminance of Examples 1 to 3 in which diffusion films A, B and C having different hazes are inserted as the diffusion sheet 3. Also, the measurement result of Comparative Example 1 in which the diffusion sheet has not been used is shown in FIG. 14 for the sake of the comparison. As shown in FIG. 14, the smallest entrance unevenness is achieved in Example 3 in which the diffusion film C having the highest haze has been used. However, as the haze of the diffusion film increases, the front luminance of the center portion of the backlight unit decreases.

Figures 15, 16:
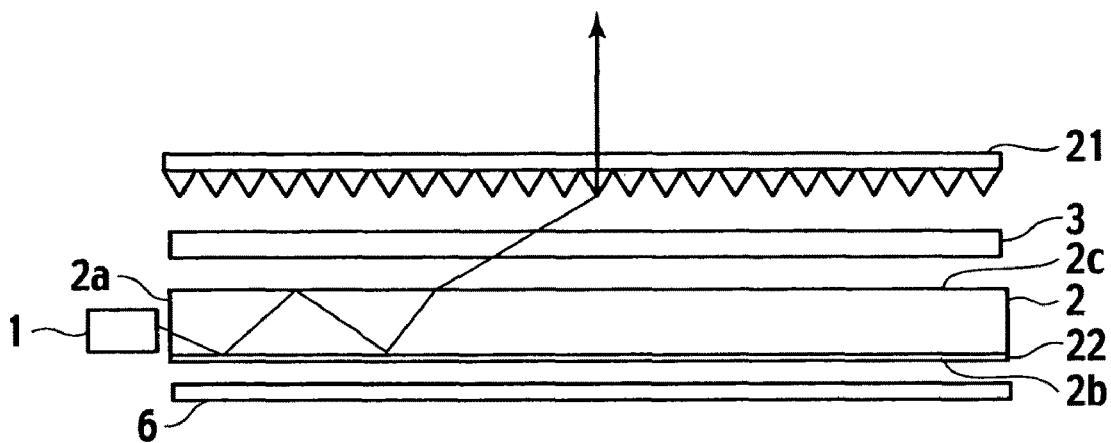
FIG. 15 is a cross sectional view showing another example of the backlight unit used in the description of the embodiment of the present invention.
FIG. 16 is a table showing another example of measurement results of the light unevenness of the backlight unit using the diffusion sheet.

For the backlight unit shown in FIG. 15, in which the downward prism sheet 21 is used as the lens sheet, the entrance unevenness and the front luminance are similarly measured. A plurality of prism columns in which each ridge line is parallel to the end surface 2a is arranged abutting each other on the bottom surface of the downward prism sheet 21 facing the diffusion sheet 3. For the downward prism sheet 21, a commercially available prism sheet (for example, S163 made by Mitsubishi Rayon Co., Ltd.) may be used. The backlight unit shown in FIG. 15 differs from the backlight unit shown in FIG. 5 in that the downward prism sheet 21 is used as the lens sheet. Other configurations are similar as the backlight unit shown in FIG. 5, and thus duplicated descriptions are omitted.

FIG. 16 is a table showing the measurement result of the entrance unevenness and the front luminance of Examples 4 to 6 in which the diffusion films A, B and C having the different hazes are inserted as the diffusion sheet 3. Also, the measurement result of Comparative Example 2 in which the diffusion sheet has not been used is shown in FIG. 16 for the sake of the comparison. As shown in FIG. 16, the smallest entrance unevenness is achieved in Example 6 in which the diffusion film C having the highest haze has been used. However, as the haze of the diffusion film increases, the front luminance of the center portion of the backlight unit decreases. Note that the higher front luminance is achieved in Comparative Example 2, as compared with Comparative Example 1 shown in FIG. 14.

For the backlight unit shown in FIG. 17, in which a diffraction grating sheet 21a is used as the lens sheet, the entrance unevenness and the front luminance are similarly measured. A plurality of ridges, which are parallel to each other, having a saw-toothed cross sections are provided on the bottom surface of the diffraction grating sheet 21a facing the diffusion sheet 3. As shown in FIG. 18, the ridges are arrayed with a pitch Pd. An angle between the normal to a slant surface of each ridge and the normal to the top surface of the diffraction grating sheet 21a is defined by $\alpha_F$. An angle between the normal to the other slant surface of each ridge and the normal to the top surface of the diffraction grating sheet 21a is denoted by $\alpha_B$. An incident angle between an incident light L2 and the normal to the top surface of the diffraction grating sheet 21a is denoted by $\theta$i. It is desirable to provide the pitch Pd between about 1 μm and about 10 μm, and angular conditions of the angle $\alpha_F$ between about 70° and about 89.5°, and the angle $\alpha_B$ with respect to the incident angle $\theta$i satisfying the relation of $(\theta_i/2.69-5) \leq (78-\alpha_B) \leq (\theta_i/2.69+5)$.

For example, for the diffraction grating sheet 21a, the pitch pd of the ridge is about 5 μm, the angle $\alpha_F$ is about 80°, and the angle $\alpha_B$ is about 54°. Here, the incident angle $\theta$i of the incident light L2 to the diffraction grating sheet 21a is about 68° corresponding to the apex angle $\theta$max at which the luminous intensity of the output light from the light guide plate 2 is maximal. Values of $(\theta i/2.69-5)$, $(\theta i/2.69+5)$, and $(78-\alpha_B)$ are about 20.28°, about 30.29°, and about 24°, respectively. Hence, the angles $\alpha_F$, $\alpha_B$ satisfy the foregoing angular conditions.

Specifically, using a diamond turning tool having a ridge shape shown in FIG. 18, a mold for molding the diffraction grating is fabricated by machining (a turning machine). An ultraviolet (UV) cure resin, such as acrylic, is coated on a surface of the mold, and commercially available easy-adhesion type polyester (PET) (for example, COSMOSHINE A4300, 50 μm thick, made by Toyobo Co., Ltd.) is overlapped on the coated UV cure resin. The UV cure resin overlapped by the PET film is flattened by a rubber roller so that the UV cure resin is uniform. From above the easy-adhesion type PET, a UV light is irradiated to the UV cure resin by a metal halide lamp with an output power of about 1500 mJ. Thereafter, a diffraction grating type light collection film is fabricated by being peeled from the mold.

The backlight unit shown in FIG. 17 differs from the backlight units shown in FIGS. 5 and 15 in that the diffraction grating sheet 21a is used as the lens sheet. Other configurations are similar as the backlight units shown in FIGS. 5 and 15, and thus duplicated descriptions are omitted.

FIG. 19 is a table showing the measurement result of the entrance unevenness and the front luminance of Examples 7 to 9 in which the diffusion films A, B and C having the different hazes are inserted as the diffusion sheet 3. Also, the measurement result of Comparative Example 3 in which the diffusion sheet has not been used is shown in FIG. 19 for the sake of comparison. As shown in FIG. 19, the smallest entrance unevenness is achieved in Example 9 in which the diffusion film C having the highest haze has been used. However, as the haze of the diffusion film increases, the front luminance of the center portion of the backlight unit decreases. Note that the higher front luminance is achieved in Comparative Example 3, as compared with Comparative Examples 1, 2 shown in FIGS. 14 and 16.

Figure 20:
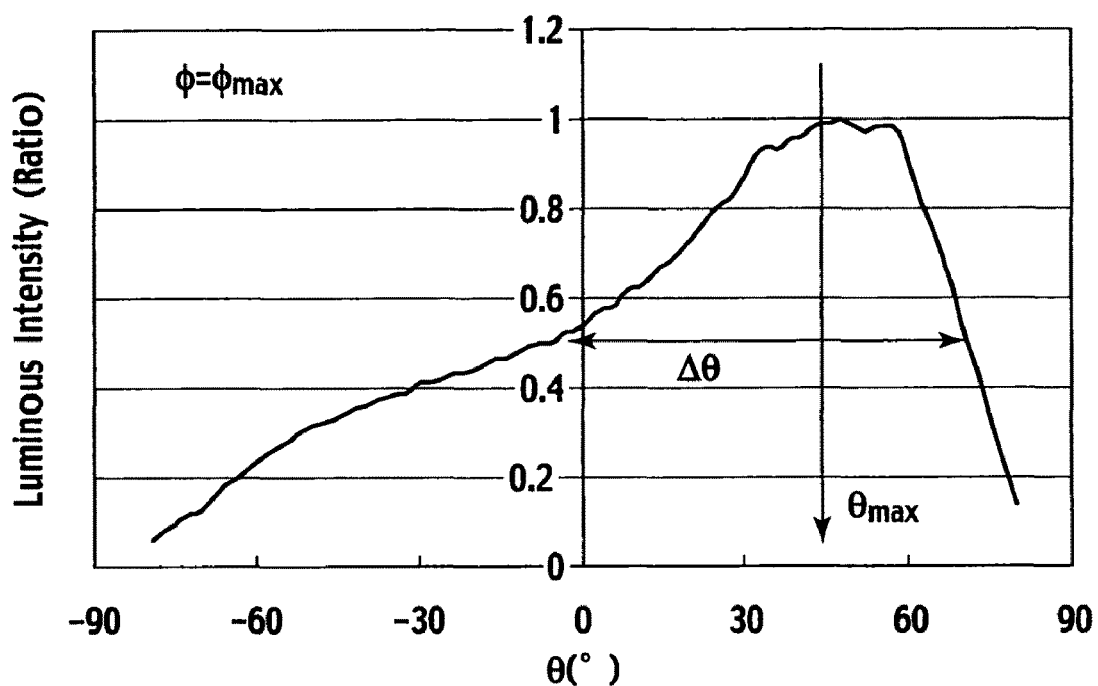
FIGS. 20 and 21 are views showing an example of an angle distribution of luminous intensity of light through the diffusion film.
Figure 21:
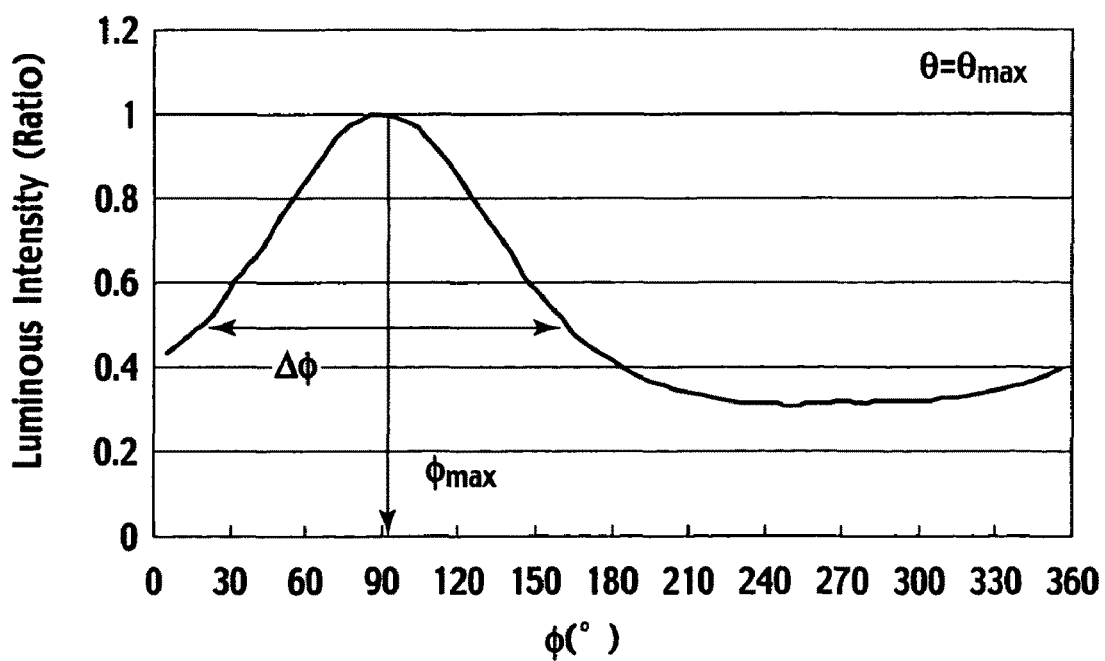

As discussed above, in order to reduce the entrance unevenness and increase the front luminance, only the luminous intensity angle distribution of the output light from the light entrance area of the light guide plate 2 may be similar to that of the light through the diffusion film C. FIGS. 20 and 21 show angle distribution of the luminous intensity through the diffusion film C having a haze of about 91%. As shown in FIGS. 20 and 21, the luminous intensity angle distribution is such that, when the azimuth angle is $\phi$max, the zenith angle $\theta$max is about 45° and the FWHM angle $\Delta\theta$ is about 75°, and when the zenith angle is $\theta$max, the azimuth angle $\phi$max is about 90° and the FWHM angle $\Delta\phi$ is about 145°. That is, when the luminous intensity angle distribution of the output light from the light guide plate 2 near the light entrance area can approximate to the distribution shown in FIG. 20 and FIG. 21, the entrance unevenness can be improved.

Additionally, as shown in FIGS. 20 and 21, there is a considerable degree of skirt shape in the angle distribution. Evidently, the skirt-shaped portion is a portion which deteriorates usage efficiency of the light. Thus, the luminous intensity angle distribution of the output light in the vicinity of the light entrance portion of the light guide plate 2 is preferably θmax of about 45°±15°, φmax of about 90°, Δθ of about 70°±10°, Δφ of about 130°±20°, and with less skirt shape, in consideration of usage efficiency of the light. Also, the luminous intensity angle distribution is more preferably θmax of about 45°±10°, φmax of about 90°, Δθ of about 70°±5°, and Δφ of about 125°±15°.

Here, when θmax is outside the above-discussed preferable range of the luminous intensity angle distribution, the improvement effect of the entrance unevenness is small. Furthermore, when Δθ is less than 60° or Δφ is less than 110°, dispersion of the output light is small, and the improvement effect of the entrance unevenness is small. When Δθ exceeds 80° or Δφ exceeds 150°, the angle distribution of the output light is excessively spread, and the luminance is decreased. Consequently, in order to increase the luminance of the light entrance area to a level of the display area, it is necessary to emit a large amount of the light in the vicinity of the light entrance portion. As a result, the amount of light used in the display area is decreased, and the luminance of the backlight unit is decreased. Hence, the angle distribution, in which Δθ exceeds 80° or Δφ exceeds 150°, is not desirable. In addition, a φmax of about 90° is typical for the light guide plate.

As the light guide plate 2 used in the backlight unit, if the output property in the vicinity of the light entrance portion is within the range of the above-discussed luminous intensity angle distribution, there are no special limitations on the means for achieving the above-mentioned luminous intensity angle distribution. For example, a reflection element, such as a plurality of grooves, a spherical lens, a lenticular lens or the like, is provided on at least one of the top surface 2c (emitting surface) in the vicinity of the light entrance portion of the light guide plate 2 and the bottom surface 2b opposite thereto. The luminous intensity angle distribution is calculated by ray tracing simulation. A shape of the reflection element is determined such that the calculation result fits into the range of the above-mentioned luminous intensity angle distribution. Thus, there are no limitations to the shape of the reflection element provided in the vicinity of the light entrance portion of the light guide plate 2 in order to improve the entrance unevenness.

Moreover, there are no special limitations to the area ratio of the portion of the reflection element formed in the vicinity of the light entrance portion to the flat portion thereof. If the area ratio of the reflection element in the vicinity of the light entrance portion is excessively high, the large amount of the light is emitted in the vicinity of the light entrance portion, and the luminance in the display area may be decreased. On the other hand, if the area ratio is excessively low, the improvement effect of the entrance unevenness becomes small. Thus, the area ratio of the reflection element in the vicinity of the light entrance portion should be determined in accordance with the specification of the luminance and the distance between the end surface 2a serving as the entrance surface of the light guide plate 2 and the region of the light guide plate 2 corresponding to the display area. In addition, there are no limitations to the shape of the reflection element for changing the direction of the light and emitting the light in the region except the vicinity of the light entrance portion of the light guide plate 2.

Figure 22:
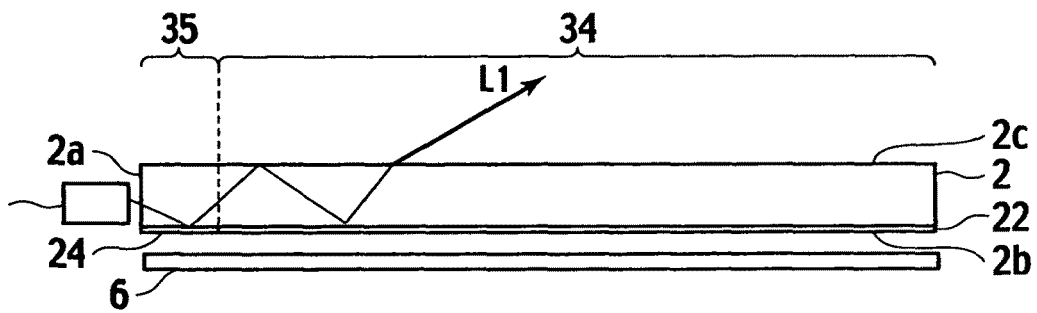
FIG. 22 is a cross sectional view showing an example of the light guide plate according to the embodiment of the present invention.

As shown in FIG. 22, a reflection element (first reflection element) 22 and a reflection element (second reflection element) 24 are provided in the bottom surface 2b of the light guide plate 2. The reflection element 22 is provided in a region (first region) corresponding to the display area 34. The reflection element 24 is provided in a region (second region) corresponding to the light entrance area 35. The reflection element 22 reflects the light that entered from the end surface 2a in a first angle with respect to the bottom surface 2b. The reflection element 24 reflects the light that entered from the end surface 2a in a second angle, which differs from the first angle, with respect to the bottom surface 2b.

Figure 23:
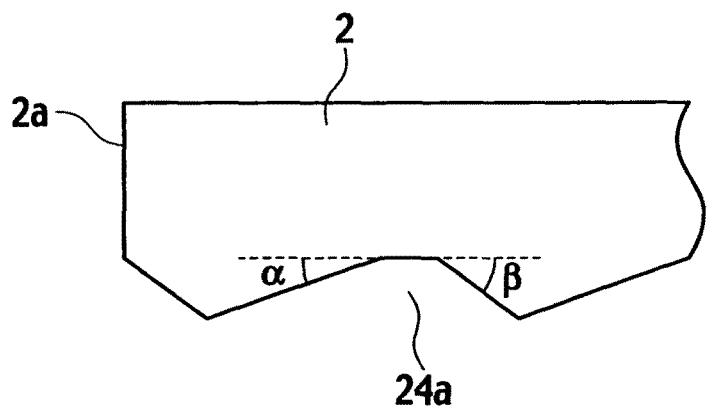
FIG. 23 is a cross sectional view showing an example of the reflection element in the light guide plate according to the embodiment of the present invention.
Figure 24:
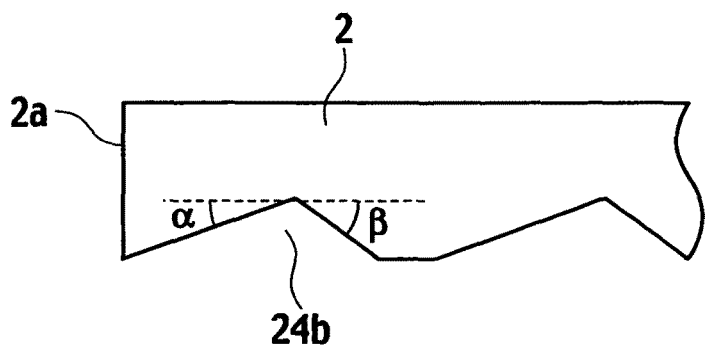
FIG. 24 is a cross sectional view showing another example of the reflection element in the light guide plate according to the embodiment of the present invention.

As shown in FIGS. 23 and 24, for a reflection element 24, a plurality of grooves 24a, 24b having edge lines abutting each other and parallel to the end surface 2a, may be used. Each of the grooves 24a is a trapezoidal groove having a flat portion on the base end of the groove. Each of the grooves 24b is a triangular groove having a flat portion on the top end of the groove. In the grooves 24a, 24b, a slant surface in which the normal toward the inside of the light guide plate 2 intersects the end surface 2a is defined as a first slant surface, and the other slant surface is defined as a second slant surface. A tilt angle between the first slant surface and the normal to the end surface 2a is denoted by α, and a tilt angle between the second slant surface and the normal to the end surface 2a is denoted by β. Here, for the light entering from the end surface 2a, the first slant surface has a reflection function. As a result of the ray tracing simulation, in order to achieve the desired luminous intensity angle distribution of the second region, the reflection element 24 is desirably formed by one type of grooves or by a combination of more than one type of grooves, each having a tilt angle α of 25°±10°.

The grooves 24a, 24b can be formed by injection mold which is easily fabricated by a diamond turning machine and the like. Thus, it is possible to easily fabricate the light guide plate 2 having the desired luminous intensity angle distribution of the second region. There are no special limitations to the tilt angle β of the second slant surface. However, from the viewpoint of easy processing of the injection mold, a tilt angle β of about 75° or less is desired. The light guide plate 2 is provided by injection molding and the like using a highly transparent material, such as polycarbonate, acryl and the like, as mentioned above. However, there are no special limitations to the material of the light guide plate 2 and a fabrication method thereof.

The reflection element 24 may be formed in a distance range within the second region between the end surface 2a, which is the entrance surface of the light, and the first region corresponding to the display area 34. The distance range is desirably shorter by about 1 mm than the distance from the first region, and more desirably shorter by about 1.5 mm than the distance from the first region.

If reflection element 24 is formed in the distance range that is shorter by about 1 mm or by about 1.5 mm than the distance from the first region, there are no special limitations to a reflection element to be formed in a region between the end of the reflection element 24 and the first region. However, a reflection element having the same shape as the reflection element 22, which provides the same angle distribution of the first region, may be formed in the region between the end of the reflection element 24 and the first region. More desirably, a reflection element, which provides an intermediate or continuously changed angle distribution between those of the first and second regions, may be provided in the region between the end of the reflection element 24 and the first region.

Thus, in the embodiment, in order to achieve the predetermined luminous intensity angle distribution in the vicinity of the light entrance portion, the grooves having a tilt angle α of about 25°±10° is formed in the vicinity of the light entrance portion the light guide plate 2. As a result, it is possible to achieve a backlight unit having uniform luminance, and without brightness unevenness in the vicinity of the end surface 2a to which the light from the light source 1 enters.

Figure 25:
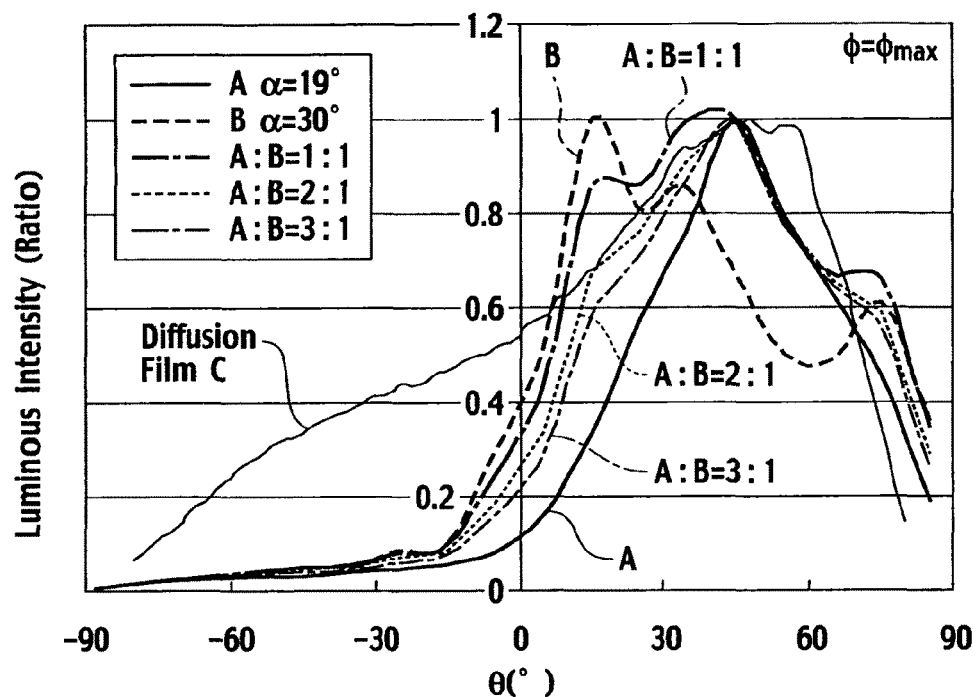
FIG. 25 is a view showing calculation results of angle distributions of luminous intensities of the light guide plate according to the embodiment of the present invention.

For the second region corresponding to the light entrance area 35 of the light guide plate 2 shown in FIG. 22 having the grooves 24a as the reflection element 24, ray tracing simulation has been performed while changing the tilt angle α of each groove 24a shown in FIG. 23. FIG. 25 shows the calculation result of the luminous intensity angle distribution with regard to the zenith angle θ of the output light for a groove pattern A having a tilt angle α of about 19° and a groove pattern B having a tilt angle α of about 30°. Note that the azimuth angle φ is φmax. Also, the measurement result of the luminous intensity angle distribution through the diffusion film C having a haze of about 91% on the light guide plate 2 is shown in FIG. 25. Moreover, the luminous intensity angle distribution has been also calculated when the groove patterns A and B are combined with ratios of 1:1, 2:1 and 3:1.

Figure 26:
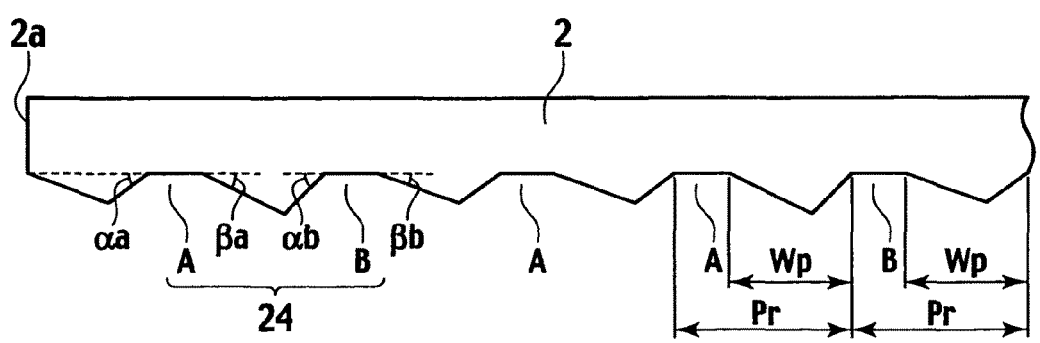
FIG. 26 is a cross sectional view showing another example of the reflection element in the light guide plate according to the embodiment of the present invention.

FIG. 26 shows the reflection element 24 when the groove patterns A and B are combined at a ratio of 2:1. As shown in FIG. 26, both of tilt angles βa and βb of the grove patterns A and B having the tilt angle αa of about 19° and about 30°, respectively, are about 11°. Both widths Wp of the triangular ridges of the groove patterns A and B are about 0.0435 mm, and both pitches Pr of the groove patterns A and B are about 0.0925 mm.

Figure 27:
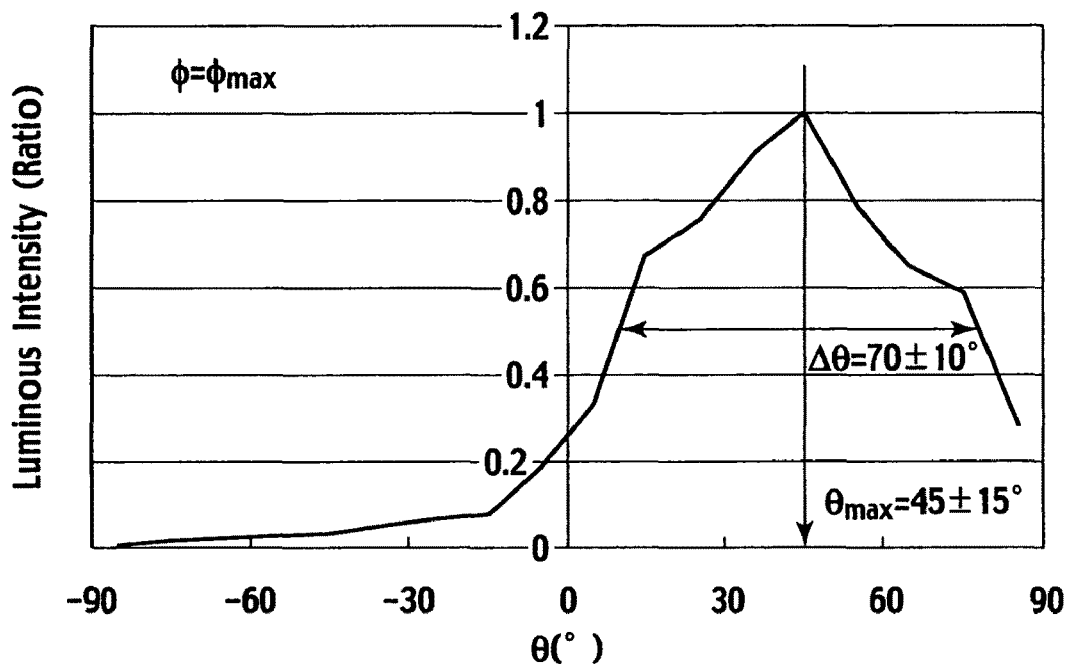
FIGS. 27 and 28 are views showing an example of angle distributions of luminous intensities of the light guide plate according to the embodiment of the present invention.
Figure 28:
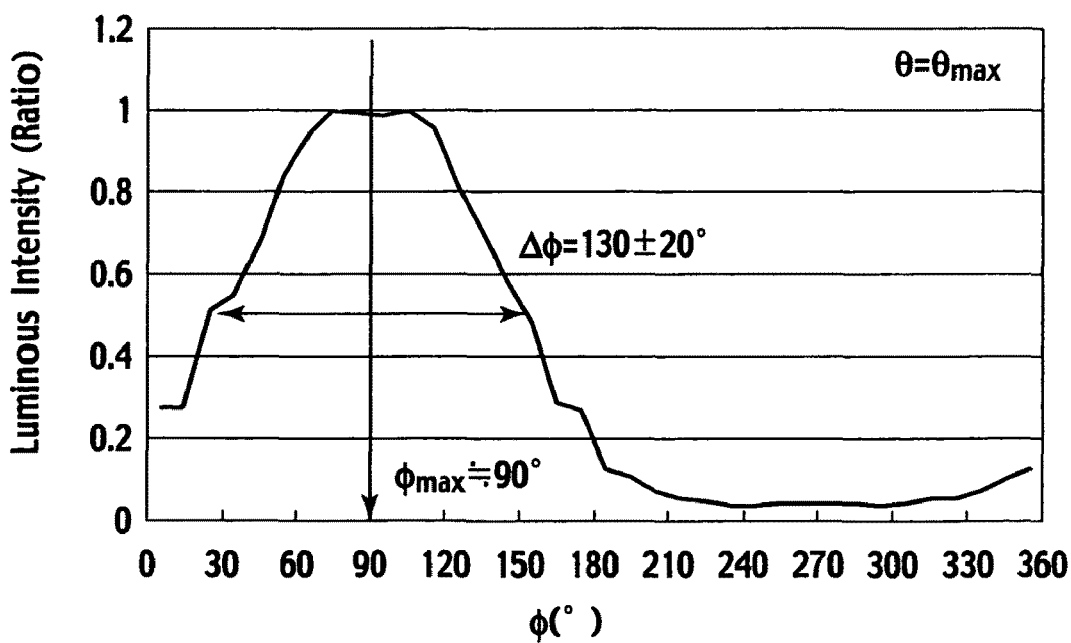

As shown in FIG. 25, the angle distribution of light guide plate 2 using the groove pattern A, the FWHM angle Δθ is small as compared with the case of the diffusion film C. In the case of the groove B, although the FWHM angle Δθ increases, the zenith angle θmax at the maximum luminous intensity is deviated to about 15°. When the groove patterns A and B are combined at the ratios of 1:1, 2:1 and 3:1, the angle distributions approximate to the angle distribution of the diffusion film C. In the case of A:B=2:1, as shown in FIGS. 27 and 28, the zenith angle θmax is about 45°, the FWHM angle Δθ is about 68°, the azimuth angle φmax is about 90°, and the FWHM angle Δφ is about 131°. Thus, the light guide plate 2 in which the groove patterns A, B are used at the ratio of 2:1 satisfies the luminous intensity angle distribution determined by using the diffusion film C.

(Backlight Unit)

Figure 29:
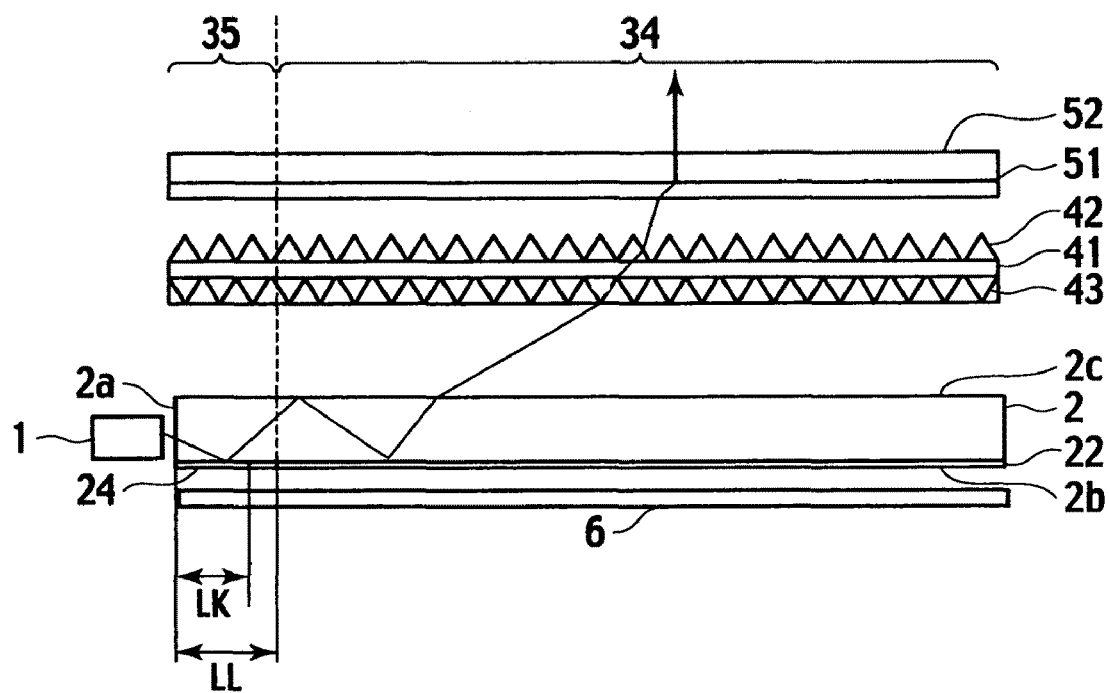
FIG. 29 is a cross sectional view showing an example of the backlight unit according to the embodiment of the present invention.

The backlight unit according to the embodiment of the present invention includes a light source 1, a light guide plate 2, lens sheets (41, 51) and a reflection sheet 6, as shown in FIG. 29. The light guide plate 2 has reflection elements 22, 24 on the bottom surface 2b. The reflection element 22 is formed in the first region corresponding to the display area 34 of the backlight unit. The shape and arrangement of the reflection element 22 are designed such that the positional luminance distribution of the output light from the light guide plate 2 becomes uniform, by ray tracing simulation in the display area 34. The reflection element 24 is formed in the second region corresponding to the light entrance area 35 of the backlight unit. The groove pattern shown in FIG. 26, in which the ratio between the grooves A and B is 2:1, is used for the reflection element 24.

The backlight unit according to the embodiment differs from the backlight unit shown in FIG. 5 in that the reflection element 24 is formed on the bottom surface 2b of the second region of the light guide plate 2 and that the diffusion sheet is not used. Other configurations are similar as the backlight unit shown in FIG. 5, and thus duplicated descriptions are omitted.

The reflection element 24 is provided in a range of a distance LK from the end surface 2a of the light guide plate 2. The distance LK is shorter than the distance LL between the end surface 2a of the light guide plate 2 and the display area 34. Specifically, the distance LL is about 3.5 mm, and the distance LK is about 2 mm.

The reflection element 22 reflects the light incident from the end surface 2a with a first angle to the bottom surface 2b. The reflection element 24 reflects the light incident from the end surface 2a with a second angle, different from the first angle, to the bottom surface 2b.

Figure 30:
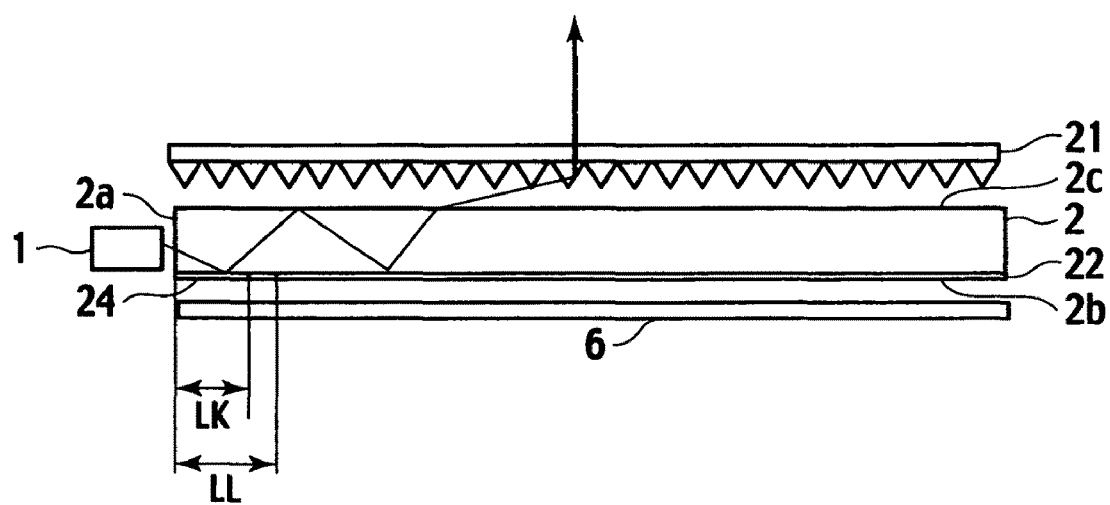
FIG. 30 is a cross sectional view showing another example of the backlight unit according to the embodiment of the present invention.

In addition, instead of the lens sheets (41, 51) of the two prism sheets 41, 51, the downward prism sheet 21 shown in FIG. 15 may be used as the lens sheet, as shown in FIG. 30. Also, the diffraction grating sheet 21a shown in FIGS. 17 and 18 may be used as the lens sheet, as shown in FIG. 31. In the backlight units shown in FIGS. 29 to 31, the reflection elements 22, 24 may be formed on the top surface 2c instead of the bottom surface 2b.

In a table shown in FIG. 32, measurement results of the entrance unevenness of Examples 10 to 15 according to the embodiment are presented. Also, in the table shown in FIG. 32, measurement results of Comparative Examples 1 to 3, which are shown in the tables shown in FIGS. 14, 16 and 19, are presented.

As shown in the table of FIG. 32, the entrance unevenness values of Examples 10 and 11, in which the prism sheets 41, 51 are used, are about 3.9 mm and about 3.3 mm, respectively. The entrance unevenness value of Comparative Example 1 is about 4.7 mm. Thus, the entrance unevenness is improved in both of the examples 10, 11. The entrance unevenness values of Examples 12, 13, in which the downward prism sheet 21 is used, are about 4.5 mm and about 3.6 mm, respectively. The entrance unevenness value of Comparative Example 2 is about 6.8 mm. Thus, the entrance unevenness is improved in both of Examples 12, 13. Also, the entrance unevenness values of Examples 14, 15, in which the diffraction grating sheet 21a is used, are about 4.3 mm and about 3.5 mm, respectively. The entrance unevenness value of Comparative Example 3 is about 5.4 mm. Thus, the entrance unevennesses are improved in both of Examples 14, 15. In all of the cases, the entrance unevenness is small when the reflection elements 22, 24 are formed on the top surface 2c, as compared with the bottom surface 2b.

In Examples 10 to 15, the distance LL between the end surface 2a serving as the entrance surface and the display area 34 is about 3.5 mm, and the distance LK where the reflection element 24, which has a different output property from the reflection element 22, is about 2 mm. Thus, by reducing the distance LK to be shorter than the distance LL, the entrance unevenness of the backlight unit can be improved. Actually, in the backlight unit, it is common to provide a black light shielding tape so as to cover the light entrance region of the distance LL and the light source 1. For example, if the reflection element 24 is formed beyond the distance LL, since the reflection element 24 has the different reflection property from the reflection element 22 formed in the first region corresponding to the display area 34, the boundary due to the different shapes between the reflection element 22, 24 become clearly visible, and also the difference of the brightness becomes clear.

If the distance LK is less than the distance LL but longer than (LL−1.5) mm, it is difficult to practically reduce the entrance unevenness. This is because, since the reflection element 24 has different shape and output property from the reflection element 22, it is impossible to perfectly conform the brightness of the boundary region between the display area 34 and the light entrance area 35 in all viewing directions. As a result, the difference of the brightness becomes visible over the boundary between the display area 34 and the light entrance area 35.

Figure 33:
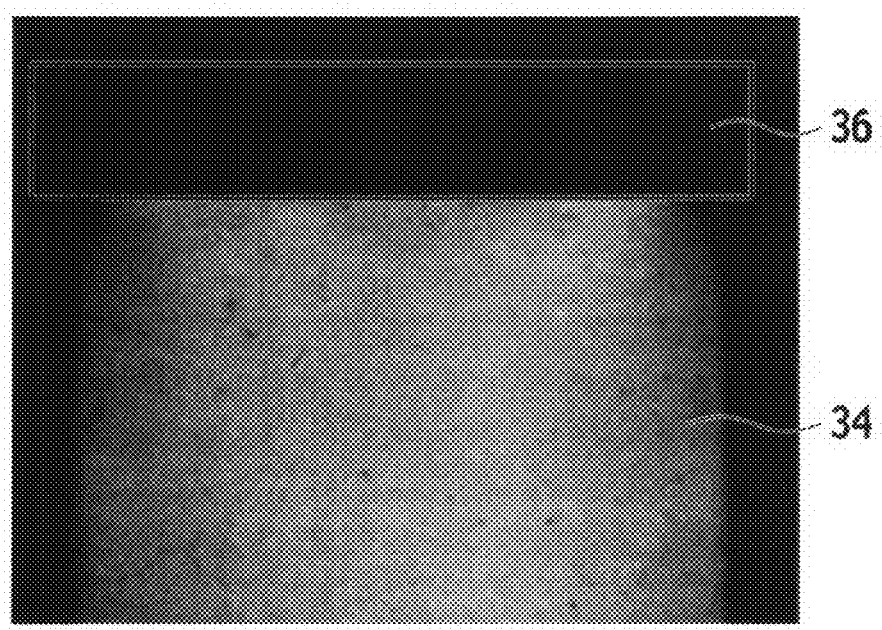
FIGS. 33 and 34 are views describing appearance evaluation of the backlight unit according to the embodiment of the present invention.
Figure 34:
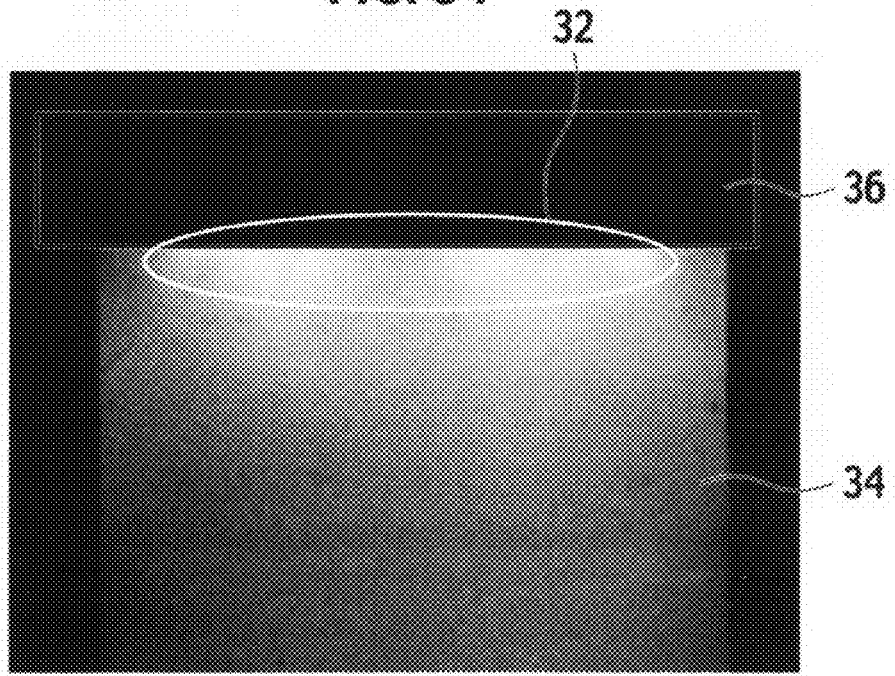

Experimental light guide plates have been fabricated by changing the distance (area) in which the reflection element 24 having a different shape from the reflection element 22 formed in the first region corresponding to the display area 34 has been formed and assembled into the backlight unit. As shown in FIGS. 33 and 34, lighting evaluation has been performed by masking the light entrance area 35, which is the non-display area, with a light shielding tape 36. As a result, it has been determined that, when the distance LK is (LL−1.5) mm or less, the unevenness caused by the luminance difference due to the shape difference between the reflection elements 22, 24 may not be observed.

Specifically, with the same configuration of Examples 11, 13 and 15 shown in the table of FIG. 32, the reflection elements 22, 24 have been formed on the top surface 2c of the light guide plate 2. The distance LL between the end surface 2a and the first region corresponding to the display area 34 is set to about 3.5 mm. The light guide plates 2 having the reflection elements 24 in the range of the different distances LK from the end surface 2a have been fabricated. The distances LK are set to about 1.7 mm, about 2 mm, about 2.5 mm, and about 3.0 mm, respectively. The total number of the grooves A, B shown in FIG. 12 are 18, 21, 27 and 33 in the respective distance LK.

The measurement of the entrance unevenness and appearance evaluation has been performed for the backlight unit having each light guide plate 2 fabricated as discussed above. The light source 1 and the second region in the distance LL from the end surface 2a have been masked with the black light shielding tape 36, and the appearance of the backlight unit has been observed. The appearance evaluation has been performed such that, as shown in FIGS. 33 and 35, a pass (G) or a fail (NG) has been determined by locally viewing a bright portion 32 at the boundary between the display area 34 and the light shielding tape 36. In the case of FIG. 33, since the bright portion 32 is not viewed, it is determined as "G". In the case of FIG. 35, since the bright portion 32 is viewed, it is determined as "NG".

A table of FIG. 35 shows the evaluation result of Examples 11, 13 and 15 and 16 to 24. The entrance unevenness values of Examples 16, 11, 17 and 18, in which the prism sheets 41, 51 have been used, are in a range of about 3.3 mm and about 3.8 mm, and shorter as compared with Comparative Example 1 shown in the table of FIG. 32. Thus, the entrance unevenness of Examples 16, 11, 17 and 18 is improved. The entrance unevenness values of Examples 19, 13, 20 and 21, in which the downward prism sheet 21 has been used, are in a range of about 3.6 mm and about 4 mm, and shorter as compared with Comparative Example 2 shown in the table of FIG. 32. Thus, the unevenness of Examples 19, 13, 20 and 21 is improved. The entrance unevenness values of Examples 22, 15, 23 and 24, in which the diffraction grating sheet 21a has been used, are in a range of about 3.5 mm and about 3.9 mm, and shorter as compared with Comparative Example 3 shown in the table of FIG. 32. Thus, the unevenness of Examples 22, 15, 23 and 24 is improved. The appearance of each of Examples 16, 11, 19, 13, 22 and 15, in which the distance LK is about 2 mm or less, is excellent.

Thus, as the range in which the reflection element 24 is formed, the distance LK is preferably about (LL−1.5) mm or less in order to improve the entrance unevenness of the light entrance portion of the backlight unit. Moreover, when the distance LK is excessively short, the improvement effect of the entrance unevenness is reduced. Thus, as the lower limit of the range in which the reflection element 24 is formed, the distance LK is preferably (LL−1.5) mm or less, and to be as close as possible to (LL−1.5) mm. Also, the distance LK depends on the thickness of the light guide plate 2 and the output property in the vicinity of the light entrance portion. For example, when the thickness of the light guide plate 2 is about 1 mm or less, the condition of (LL−1.5) mm or less is effective as the distance LK.

In this way, according to the backlight unit according to the embodiment, it is possible to reduce the entrance unevenness in the vicinity of the light entrance portion, regardless of the type of the lens sheet in which the direction control of the light is executed to collect the light.

Other Embodiments

The present invention has been described as mentioned above. However the descriptions and drawings that constitute a portion of this disclosure should not be perceived as limiting this invention. Various alternative embodiments and operational techniques will become clear to persons skilled in the art from this disclosure.

What is claimed is:

1. A light guide plate comprising:
a plate surrounded by two main surfaces and a plurality of end surfaces connecting the main surfaces, one of the end surfaces designated as an entrance surface, one of the main surfaces designated as a reflection surface having a first region separated from the entrance surface, and a second region between the entrance surface and the first region;
a first reflection element provided in the first region, and configured to reflect a light incident from the entrance surface in a first angle with respect to the reflection surface; and
a second reflection element provided in the second region, and configured to reflect the light in a second angle different from the first angle with respect to the reflection surface,
wherein the second reflection element is formed in a distance range from the entrance surface, the distance range being shorter than a distance between the entrance surface and the first region by about 1.5 mm or more.

2. The light guide plate of claim 1, wherein the second reflection element includes a plurality of grooves each having a ridge line parallel to the entrance surface.

3. The light guide plate of claim 2, wherein the grooves include more than two types of grooves having different shapes with each other.

4. The light guide plate of claim 2, wherein each of the grooves has a slant surface in which a normal direction to the slant surface toward the inside of the light guide plate intersects the entrance surface, and a tilt angle between the slant surface and a normal direction to the entrance surface is about 25°±10°.

5. The light guide plate of claim 1, wherein an emitting surface of the light is the reflection surface.

6. The light guide plate of claim 1, wherein an emitting surface of the light is an opposite surface of the reflection surface.

7. The light guide plate of claim 1, wherein the other of the main surfaces is designated as an emitting surface, and when a zenith angle is defined as an angle between the light and a normal direction to the emitting surface, and an azimuth angle is defined as an angle between a projection line of the light to the emitting surface and a parallel line to the entrance surface, a distribution of the second angle is the zenith angle of about 45°±15° and the azimuth angle of about 90° where a luminance intensity is maximal, a full width at half maximum angle of the zenith angle of about 70°±10° and a full width at half maximum angle of the azimuth angle of about 130°±20°.

8. A backlight unit comprising:
a light source;
a light guide plate surrounded by two main surfaces and a plurality of end surfaces connecting the main surfaces, one of the end surfaces designated as an entrance surface, one of the main surfaces designated as a reflection surface having a first region separated from the entrance surface, and a second region between the entrance surface and the first region;
a first reflection element provided in the first region, and configured to reflect a light incident from the entrance surface in a first angle with respect to the reflection surface;
a second reflection element provided in the second region, and configured to reflect the light in a second angle different from the first angle with respect to the reflection surface;
a lens sheet facing the light guide plate, and configured to control a direction of the light and to collect the light; and
a reflection sheet facing the light guide plate on an opposite side of the lens sheet,
wherein the second reflection element is formed in a distance range from the entrance surface, the distance range being shorter than a distance between the entrance surface and the first region by about 1.5 mm or more.

9. The backlight unit of claim 8, wherein the second reflection element includes a plurality of grooves each having a ridge line parallel to the entrance surface.

10. The backlight unit of claim 9, wherein the grooves include more than two types of grooves having different shapes with each other.

11. The backlight unit of claim 9, wherein each of the grooves has a slant surface in which a normal direction to the slant surface toward the inside of the light guide plate intersects the entrance surface, and a tilt angle between the slant surface and a normal direction to the entrance surface is about 25°±10°.

12. The backlight unit of claim 8, wherein an emitting surface of the light is the reflection surface.

13. The backlight unit of claim 8, wherein an emitting surface of the light is an opposite surface of the reflection surface.

14. The backlight unit of claim 8, wherein the other of the main surfaces is designated as an emitting surface, and when a zenith angle is defined as an angle between the light and a normal direction to the emitting surface, and an azimuth angle is defined as an angle between a projection line of the light to the emitting surface and a parallel line to the entrance surface, a distribution of the second angle is the zenith angle of about 45°±15° and the azimuth angle of about 90° where a luminance intensity is maximal, a full width at half maximum angle of the zenith angle of about 70°±10° and a full width at half maximum angle of the azimuth angle of about 130°±20°.

15. The backlight unit of claim 8, wherein the lens sheet is a downward prism sheet having a plurality of prism columns on a bottom surface of a transparent body facing the light guide plate, each of the prism columns having a ridge line, parallel to the entrance surface, abutting each other.

16. The backlight unit of claim 8, wherein the lens sheet is a diffraction grating sheet having a plurality of ridges on a bottom surface of a transparent body facing the light guide plate, each of the ridges having a ridge line, parallel to each other, having a saw-toothed cross section.

17. The backlight unit of claim 16, wherein an angle $\alpha_A$ between a normal direction to one of slant surfaces of each of the ridges and a normal direction to a top surface of the lens sheet is in a range of about 70° to about 89.5°, and an angle $\alpha_B$ between the normal to the other slant surface of each of the ridges and the normal to the top surface of the lens sheet satisfies a relation of $(\theta i/2.69-5) \leqq (78-\alpha_B) \leqq (\theta i/2.69+5)$, for an incident angle $\theta i$ between the light and the top surface of the lens sheet.

* * * * *